(12) United States Patent
Wu et al.

(10) Patent No.: US 11,622,092 B2
(45) Date of Patent: Apr. 4, 2023

(54) IMAGE SENSING SCHEME CAPABLE OF SAVING MORE POWER AS WELL AS AVOIDING IMAGE LOST AND ALSO SIMPLIFYING COMPLEX IMAGE RECURSIVE CALCULATION

(71) Applicant: PixArt Imaging Inc., Hsin-Chu (TW)

(72) Inventors: Chih-Huan Wu, Hsin-Chu (TW); Wen-Han Yao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 8 days.

(21) Appl. No.: 17/376,127

(22) Filed: Jul. 14, 2021

(65) Prior Publication Data

US 2021/0344881 A1    Nov. 4, 2021

Related U.S. Application Data

(63) Continuation-in-part of application No. 17/151,625, filed on Jan. 18, 2021, now Pat. No. 11,336,870, which is a continuation of application No. 16/833,677, filed on Mar. 30, 2020, now Pat. No. 10,944,941, which is a continuation of application No. 16/018,025, filed on Jun. 25, 2018, now Pat. No. 10,645,351, which is a continuation-in-part of application No. 15/854,697, filed on Dec. 26, 2017, now Pat. No. 10,499,019.

(51) Int. Cl.
*H04N 7/18* (2006.01)
*G08B 13/196* (2006.01)
*G06T 7/246* (2017.01)

(52) U.S. Cl.
CPC ............ *H04N 7/188* (2013.01); *G06T 7/248* (2017.01); *G08B 13/19604* (2013.01); *H04N 7/183* (2013.01); *G06T 2207/30232* (2013.01)

(58) Field of Classification Search
None
See application file for complete search history.

(56) References Cited

U.S. PATENT DOCUMENTS

| 6,388,773 B1 * | 5/2002 | Smith ............... H04N 1/047 |
| | | 358/473 |
| 7,634,662 B2 | 12/2009 | Monroe |
| 2004/0117638 A1 | 6/2004 | Monroe |
| 2014/0303435 A1 | 10/2014 | Taniguchi |
| 2015/0305114 A1 | 10/2015 | Hack |
| 2016/0104510 A1 | 4/2016 | Tamir |
| 2016/0110973 A1 | 4/2016 | Cho |

(Continued)

FOREIGN PATENT DOCUMENTS

| CN | 101146217 A | 3/2008 |
| CN | 102695042 A | 9/2012 |

(Continued)

*Primary Examiner* — Eileen M Adams
(74) *Attorney, Agent, or Firm* — Winston Hsu

(57) ABSTRACT

A method of an image sensor circuit includes: providing an event camera comprising at least one pixel unit; using the event camera to sense at least one current pixel value of the at least one pixel unit to detect whether at least one pixel value changes; when the at least one pixel value changes, using the event camera to trigger the digital processing circuit when the digital processing circuit is in a power saving mode and transmit information of the at least one pixel value to the digital processing circuit.

20 Claims, 16 Drawing Sheets

(56) References Cited

U.S. PATENT DOCUMENTS

| | | |
|---|---|---|
| 2016/0228987 A1 | 8/2016 | Baudimont |
| 2016/0277688 A1* | 9/2016 | Gaskamp |
| 2022/0014702 A1* | 1/2022 | Yin .................. G06T 7/521 |
| 2022/0108548 A1* | 4/2022 | Kim .................. G06V 20/40 |

FOREIGN PATENT DOCUMENTS

| | | |
|---|---|---|
| CN | 104079881 A | 10/2014 |
| CN | 206442461 U | 8/2017 |

\* cited by examiner

IMAGE SENSING SCHEME CAPABLE OF SAVING MORE POWER AS WELL AS AVOIDING IMAGE LOST AND ALSO SIMPLIFYING COMPLEX IMAGE RECURSIVE CALCULATION

CROSS REFERENCE TO RELATED APPLICATIONS

This application is a continuation-in-part application of U.S. patent application Ser. No. 17/151,625 (filed on Jan. 18, 2021). U.S. patent application Ser. No. 17/151,625 is a continuation application of U.S. patent application Ser. No. 16/833,677 (filed on Mar. 30, 2020), which is a continuation application of U.S. patent application Ser. No. 16/018,025 (filed on Jun. 25, 2018), which is a continuation-in-part of U.S. patent application Ser. No. 15/854,697 (filed on Dec. 26, 2017). The disclosures of the prior applications are incorporated herein by reference herein in their entirety.

BACKGROUND OF THE INVENTION

1. Field of the Invention

The invention relates to an image monitoring scheme, and more particularly to an image sensor circuit, an image sensor apparatus, and corresponding methods.

2. Description of the Prior Art

Please refer to FIG. 1. FIG. 1 is a monitoring system 50 in prior art. The monitoring system 50 includes a passive detector 52 and an image detection device 54 electrically connected to an external host 56. The passive detector 52 can transmit a triggering signal to the external host 56 while detecting temperature variation, the external host 56 wakes up by the triggering signal and then actuates the image detection device 54, and the image detection device 54 executes an exposure adjustment while being actuated and starts to capture a monitoring image or to record monitoring video. Thus, even though the passive detector 52 detects the temperature variation, the image detection device 54 captures the monitoring image at a later time in relation to a transmission period of the triggering signal, wakeup periods of the external host 56 and the image detection device 54, and an exposure adjustment period of the image detection device 54, so that the monitoring system 50 cannot record the monitoring video right after the passive detector 52 detects an unusual state.

SUMMARY OF THE INVENTION

Therefore one of the objectives of the invention is to provide an image sensor circuit, an image sensor apparatus, and corresponding methods, to solve the problems.

According to embodiments of the invention, an image sensor circuit is disclosed. The image sensor circuit is to be externally coupled to a digital processing circuit that is arranged for performing a motion detection. The image sensor circuit comprises an event camera which comprises at least one pixel unit. The event camera is arranged for sensing at least one current pixel value of the at least one pixel unit to detect whether at least one pixel value changes. When the at least one pixel value changes, the event camera triggers the digital processing circuit when the digital processing circuit is in a power saving mode and transmits information of the at least one pixel value to the digital processing circuit.

According to the embodiments, an image sensor apparatus is disclosed. The apparatus comprises the above-mentioned image sensor circuit and the digital processing circuit. The digital processing circuit uses the information of the at least one pixel value and a last data frame stored in the digital processing circuit to generate a current data frame.

According to the embodiments, a method of an image sensor circuit to be externally coupled to a digital processing circuit that is arranged for performing a motion detection is disclosed. The method comprises: providing an event camera comprising at least one pixel unit; using the event camera to sense at least one current pixel value of the at least one pixel unit to detect whether at least one pixel value changes; when the at least one pixel value changes, using the event camera to trigger the digital processing circuit when the digital processing circuit is in a power saving mode and to transmit information of the at least one pixel value to the digital processing circuit.

According to the embodiments, a method of an image sensor apparatus is disclosed. The method comprises: providing a digital processing circuit externally coupled to the image sensor circuit to perform a motion detection; and using the information of the at least one pixel value of claim 1 and a last data frame stored in the digital processing circuit to generate a current data frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
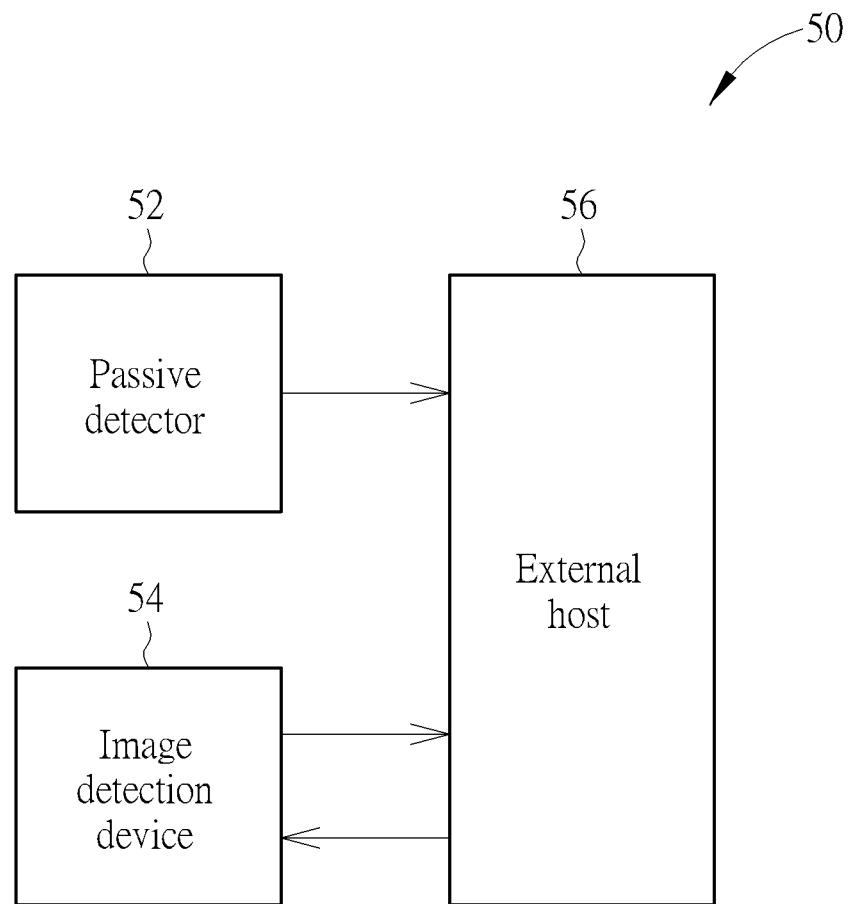
FIG. 1 is a monitoring system 50 in prior art.
Figure 2:
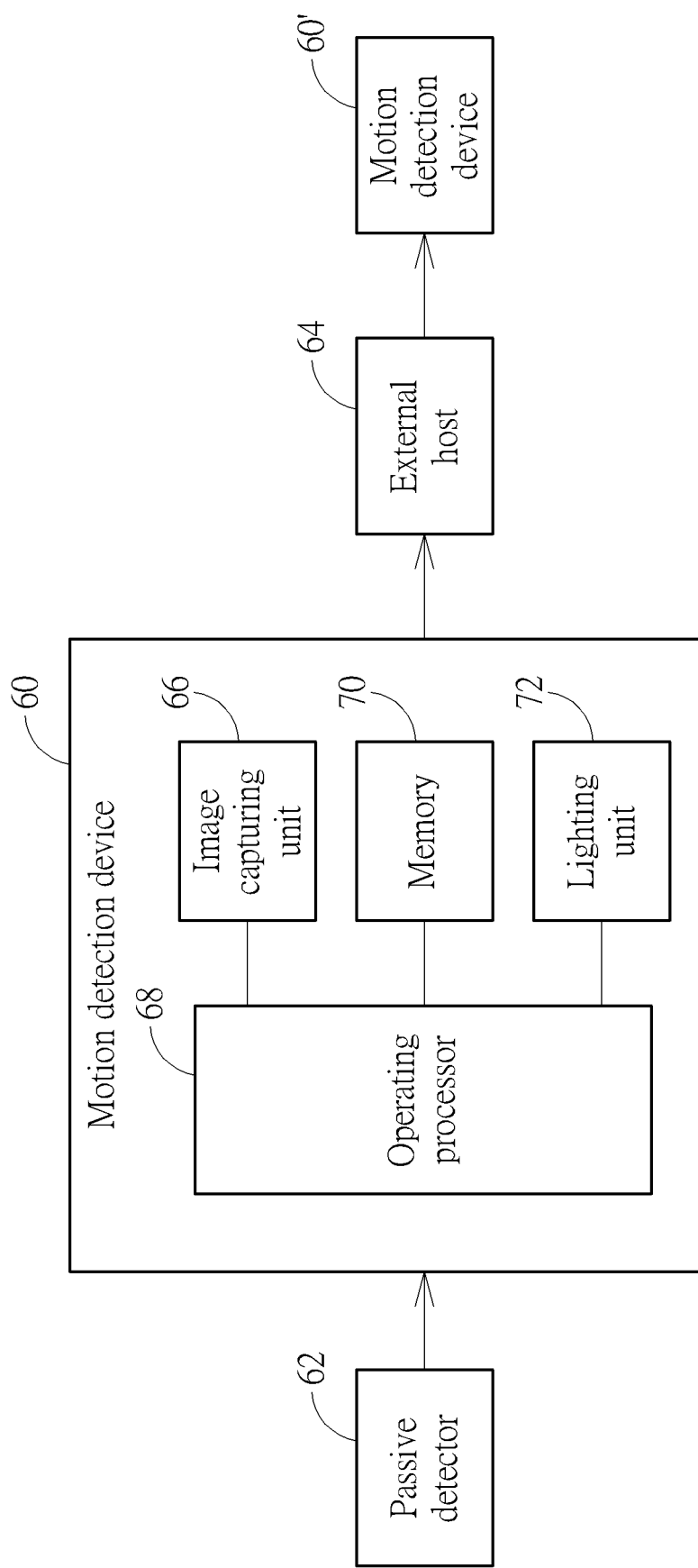
FIG. 2 is a block diagram of a motion detection device according to an embodiment of the present invention.

Please refer to FIG. 2. FIG. 2 is a block diagram of a motion detection device 60 according to an embodiment of the present invention. The motion detection device 60 can be matched with a passive detector 62 and an external host 64 to provide preferred smart motion detecting function. The motion detection device 60 is electrically connected between the passive detector 62 and the external host 64. The passive detector 62 is used to detect if a specific situation happened, such as a living thing passed by or a door opened, so as to trigger the motion detection device 60 to analyze if a true event of the specific situation existed, which means the living thing detected by the passive detector 62 is identified as an expected object. When the true event is determined, the motion detection device 60 transmits related data for the external host 64 to determine a security alarm.

In one embodiment, the passive detector 62 can be a temperature detector, such as an infrared detector, and the motion detection device 60 can be selectively operated in a sleep mode or a wakeup mode. While a monitoring region is in an usual state, the passive detector 62 does not detect temperature variation, the motion detection device 60 stays in a sleep mode; while in an unusual state that the specific situation happens (such like the living thing passed by), the passive detector 62 detects the temperature variation and generates a triggering signal to switch the motion detection device 60 from the sleep mode to a wakeup mode.

The motion detection device 60 can include an image capturing unit 66, an operating processor 68, a memory 70 and a lighting unit 72. The operating processor 68 can drive the image capturing unit 66 to alternatively switch between the sleep mode and the wakeup mode, and further can drive the image capturing unit 66 to optionally capture monitoring images with low quality and high quality. In one embodiment, the lighting unit 72 can be actuated only while the image capturing unit 66 captures image, so as to enhance the image capturing unit 66 capturing images in a power efficiency manner.

The image capturing unit 66 may capture a background monitoring image with a low frame rate in the sleep mode, and capture a plurality of monitoring images with a high frame rate in the wakeup mode. The background image could be captured in low quality, wherein the background image is used for auto-exposure control of the image capturing unit 66. The monitoring images could comprise a first monitoring image with the low quality and a second monitoring image with the high quality, wherein the first monitoring image is used for the operating processor 68 to identify if the true event is happened and the second monitoring image is used for the external host 64 to determine the security alarm. The monitoring images captured by the image capturing unit 66 can be stored inside the memory 70, and further the high quality monitoring image can be transmitted to the external host 64.

In this embodiment, the monitoring system utilizes the passive detector 62 to detect the object passing through the monitoring region for a start, and then utilizes the motion detection device 60 to analyze whether the passed object conforms to a predetermined condition (i.e., true event). As a view range of the passive detector 62 has passerby and the specific situation is identified, the motion detection device 60 is switched to the wakeup mode by the passive detector 62 and determines whether the passerby is the expected object (which means the human); if so, the motion detection device 60 actuates the external host 64, and the external host 64 identifies the object within the monitoring images to optionally drive the motion detection device 60 in a recording mode, to transmit monitoring video, to send out a warning, to shut down the motion detection device 60 and to awaken another motion detection device 60' electrically connected with the external host 64.

Figure 3:
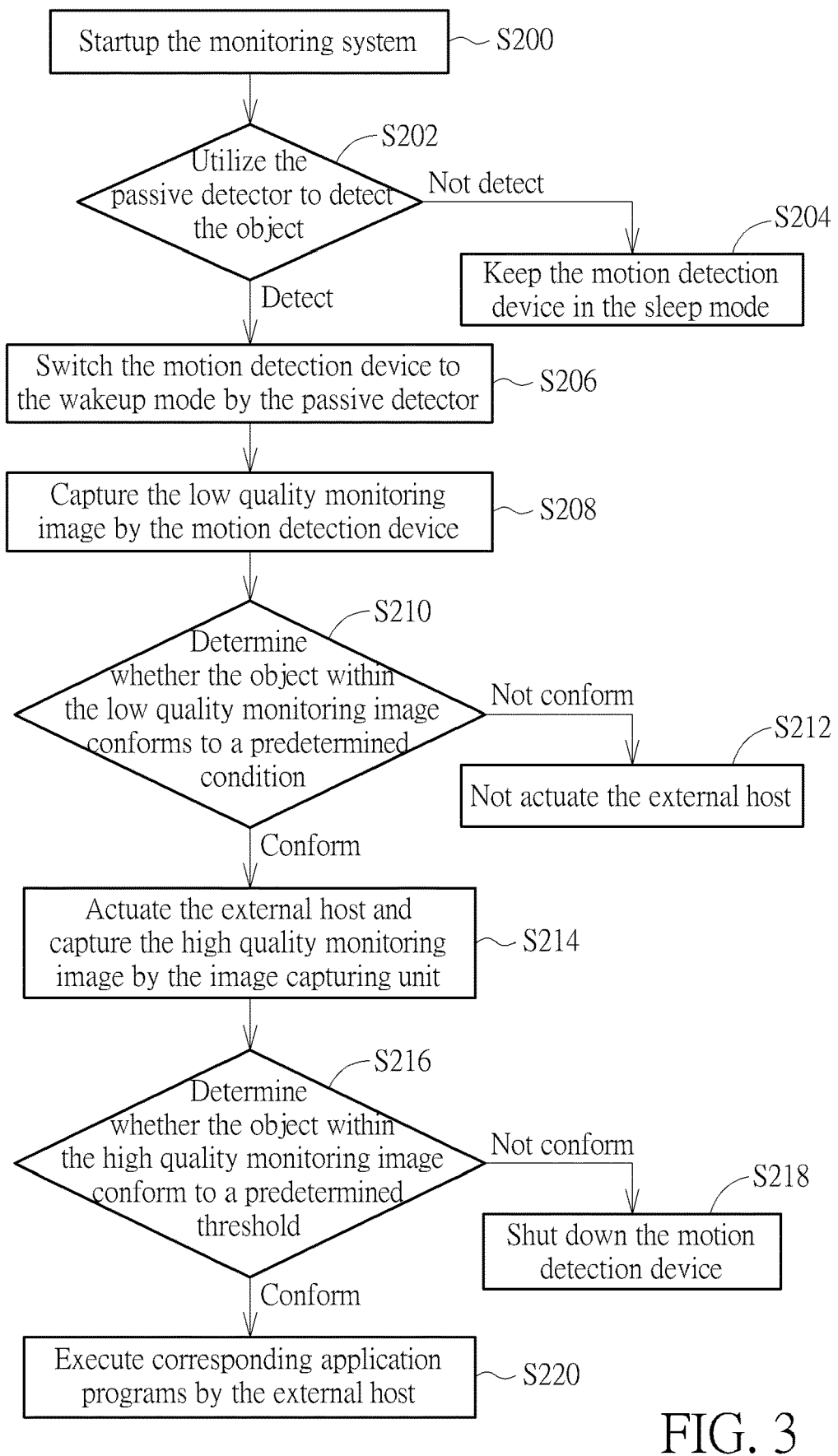
FIG. 3 is a flow chart of a motion detection method applied to the motion detection device according to the embodiment of the present invention.

Please refer to FIG. 3. FIG. 3 is a flow chart of a motion detection method applied to the motion detection device 60 according to the embodiment of the present invention. First, step S200 and S202 are executed to startup the monitoring system, and the passive detector 62 is utilized to detect the object within the view range. If the passive detector 62 does not detect the temperature variation, step S204 is executed to keep the image capturing unit 66 in the sleep mode; if the passive detector 62 detects the temperature variation, step S206 is executed that the passive detector 62 transmits the triggering signal to switch the image capturing unit 66 from the sleep mode to the wakeup mode. Then, step S208 and step S210 are executed, the lighting unit 72 can be actuated in accordance with surrounding illumination and the image capturing unit 66 captures the first monitoring image (with the low quality), the operating processor 68 simply analyzes the first monitoring image for determining whether to actuate the external host 64.

In one embodiment, the image capturing unit 66 captures the low quality monitoring image by using partial pixels, such as to divide the pixel array into a plurality of 2×2 pixel blocks and to use only one pixel in each pixel block to capture the image. In another embodiment, the image capturing unit 66 captures image by all pixels and divides all pixels to several pixel block (such as 2×2 pixel block) so as to combine values in all pixels in each pixel block as a block value and generates the low quality monitoring image by those block values.

In step S210, the operating processor 68 preferably analyzes a specific region of interest (ROI) within the first monitoring image to determine actuation of the external host 64, dimensions of the specific region is smaller than the first monitoring image, so that the operating processor 68 can rapidly acquire an image analysis result due to less data calculation in ROI; the first monitoring image setting as a low quality monitoring image is helpful to speed up image analysis about the specific region of interest. Position and dimensions of ROI are preferably pre-defined by the user, for example, a door and a window are situated in the first monitoring image, ROI can cover the pattern of the door to avoid the analysis result from being interfered by left shadow on the window, or ROI can cover edges of window for detecting a thief climbing into the window and also preventing the analysis result from being interfered by the left shadow; the position and dimensions of ROI further may be varied according to the analysis result. However, the operating processor 68 may analyze an entire region within the first monitoring image to perform the step S210, which depends on design demand. The said image analysis can be executed by identifying a pattern contour within the monitoring image, comparing feature point on the monitoring image, and analyzing intensity variation of the monitoring image optionally.

As the object does not conform to the predetermined condition, suck like the passerby within the monitoring image being the animal instead of the human, step S212 is executed to not actuate the external host 64, and the image capturing unit 66 may be passively or actively shut down to back the sleep mode. As the object conforms to the predetermined condition, which means the passerby within the monitoring image may be an unauthorized person, step S214 is executed to actuate the external host 64 and the image capturing unit 66 starts to capture the second monitoring image with the high quality, and the second monitoring image can be captured as static images format or a continuing video format and can be stored inside the memory 70. Next, step S216 is executed that the external host 64 receives the second monitoring image and utilizes image recognition algorithm to precisely analyze the object within the second monitoring image.

The second monitoring image does not conform to a predetermined threshold, which means the object is not the unauthorized person, step S218 is executed to shut down the motion detection device 60 passively or actively for energy economy; the second monitoring image conforms to the predetermined threshold, hence the object is defined as the unauthorized person, step S220 is executed that the external host 64 can switch the motion detection device 60 into the recording mode, the motion detection device 60 transmits the monitoring video outwardly for backup, and the other motion detection devices 60' can be simultaneously awaken for overall monitoring. Therefore, the passive detector 62 cannot directly actuate the external host 64 while detecting the object, the motion detection device 60 wakes up by trigger of the passive detector 62 to capture the first monitoring image, and the external host 64 is actuated in accordance with the low quality image analysis of the first monitoring image through the motion detection device 60.

The motion detection device 60 can begin to capture the second monitoring image while the external host 64 is actuated. The external host 64 has to spend a period of time on waking other motion detection devices, the second monitoring image can record any doubtful event inside the monitoring region before the other motion detection devices are awaken, which means the monitoring system does not miss the doubtful event in a term between a detection timing of the passive detector 62 and a wakeup timing of the other motion detection devices. The first monitoring image with the low quality is used by the motion detection device 60 to determine existence of the object, the existence determination is rough computation and may be affected by noise, and the second monitoring image with the high quality is used by the external host 64 to analyze the accurate motion detection of the object, such as face recognition.

Figure 4:
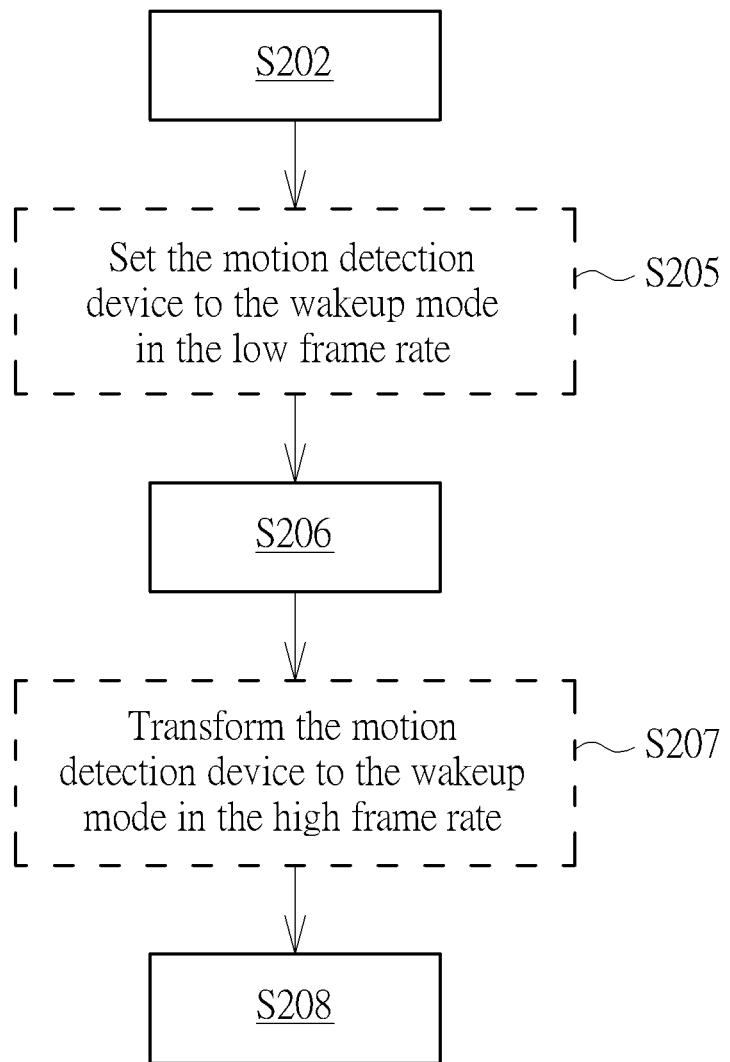
FIG. 4 is a flow chart of a motion detection method applied to the motion detection device according to the embodiment of the present invention.
Figure 5:
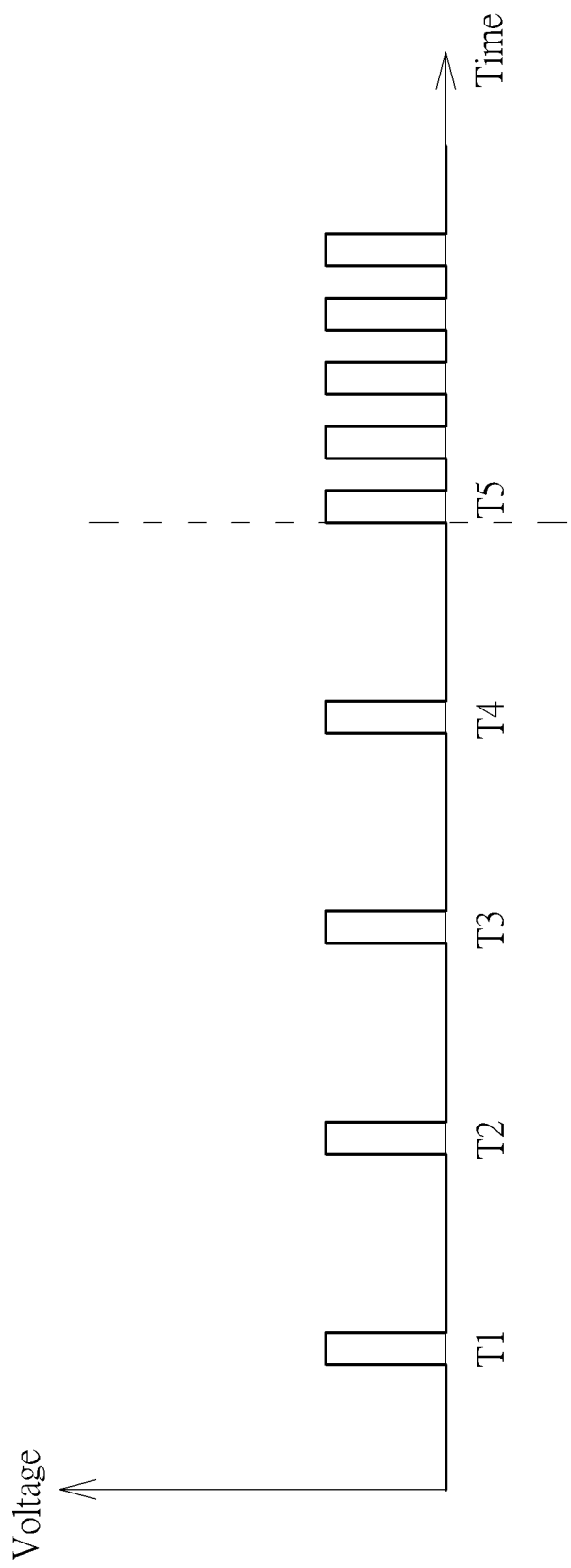
FIG. 5 is a waveform diagram of a frame rate executed by an image capturing unit according to the embodiment of the present invention.

The present invention further provides an exposure adjustment function for preferred operational efficiency of the motion detection device 60. Please refer to FIG. 4 and FIG. 5. FIG. 4 is a flow chart of a motion detection method applied to the motion detection device 60 according to another embodiment of the present invention. FIG. 5 is a waveform diagram of a frame rate executed by the image capturing unit 66 according to the foresaid embodiment of the present invention. In the embodiment, steps having the same numeral as one of the above-mentioned embodiment have the same content, and a detailed description is omitted herein for simplicity. As the motion detection device 60 is not awaken by the passive detector 62, step S205 can be executed to periodically switch the image capturing unit 66 to the wakeup mode in the low frame rate, and the image capturing unit 66 in the wakeup mode can execute the exposure adjustment and capture a low quality background image. As the motion detection device 60 is awaken, step S207 is executed to transform the image capturing unit 66 into the wakeup mode in the high frame rate, and later, the image capturing unit 66 still captures the monitoring image with the low quality to compare with the background image for determining actuation of the external host 64.

For example, as shown in FIG. 5, the image capturing unit 66 may execute the exposure adjustment and capture the background image one frame per second (1 fps) while the motion detection device 60 is not triggered by the passive detector 62, which means an exposure parameter of the image capturing unit 66 can be adjusted and the background image can be established at timing T1, T2, T3 and T4. While the passive detector 62 triggers the motion detection device 60 into the wakeup mode at timing T5, the motion detection device 60 may capture the first monitoring images thirty frames per second (30 fps), the latest background image (captured at the timing T4) has the exposure parameter similar to ones of the first monitoring image captured at the timing T5, so that the image capturing unit 66 in the wakeup mode is not in need of the exposure adjustment, and can immediately acquire the superior monitoring image with suitable exposure parameters.

In conclusion, the motion detection device of the present invention is electrically connected between the passive detector and the external host, and the motion detection device is utilized to actuate the external host while the passive detector triggers the motion detection device switched from the sleep mode to the wakeup mode. As the motion detection device is in the sleep mode, the motion detection device can be awaken in the low frame rate or stay in the sleep mode to adjust the exposure parameter and to capture the background image; as the motion detection device is switched to the wakeup mode, the motion detection device is transformed into the high frame rate to capture the low quality monitoring image. The motion detection device executes the simple image analysis via ROI of the low quality monitoring image for a start for determining whether to actuate the external host; since the motion detection device actuates the external host, the motion detection device captures and stores the high quality monitoring image, and the high quality monitoring image can be used by the external host for the accurate image analysis and execution of related application programs. The motion detection device of the present invention can effectively economize start-up time of the monitoring system without waiting for a wakeup period of the external host and an exposure adjustment period of the motion detection device.

Figure 6:
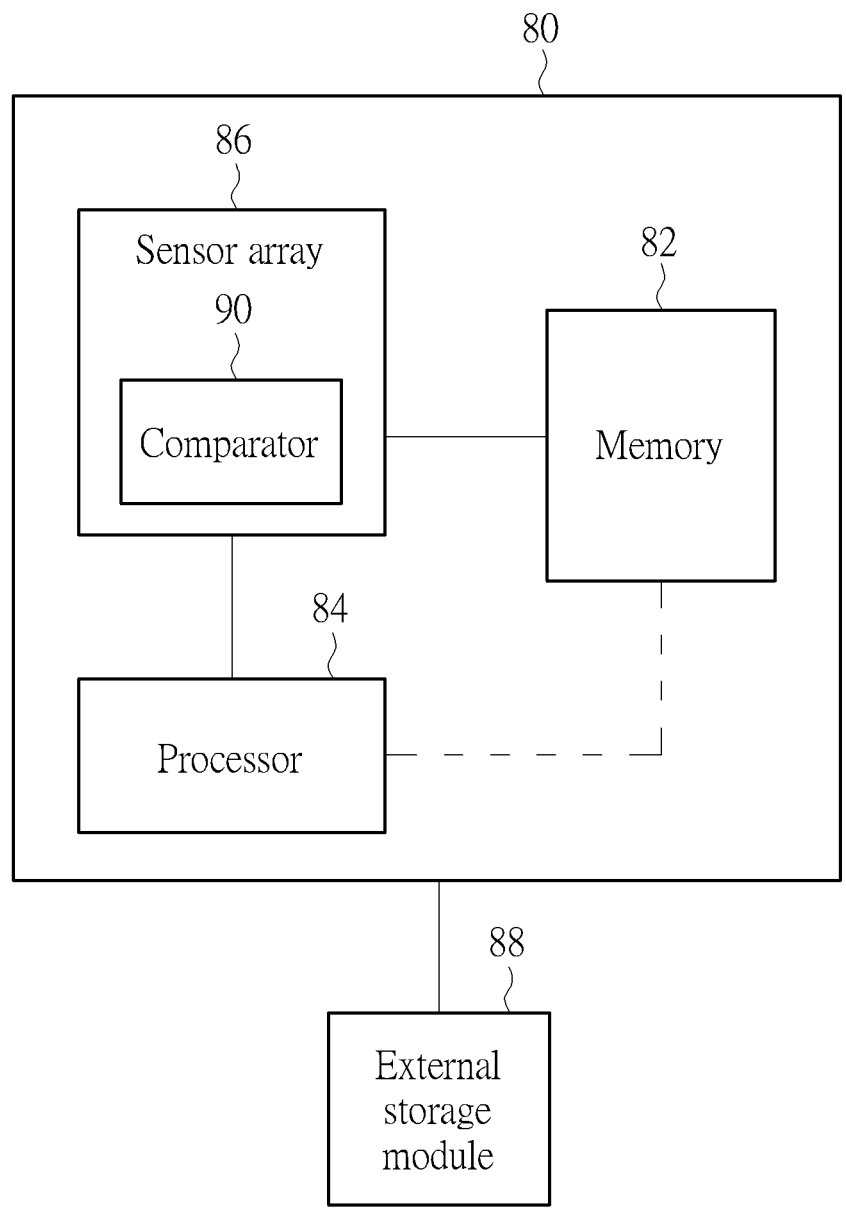
FIG. 6 is a functional block diagram of a smart motion detection device according to a first embodiment of the present invention.
Figure 7:
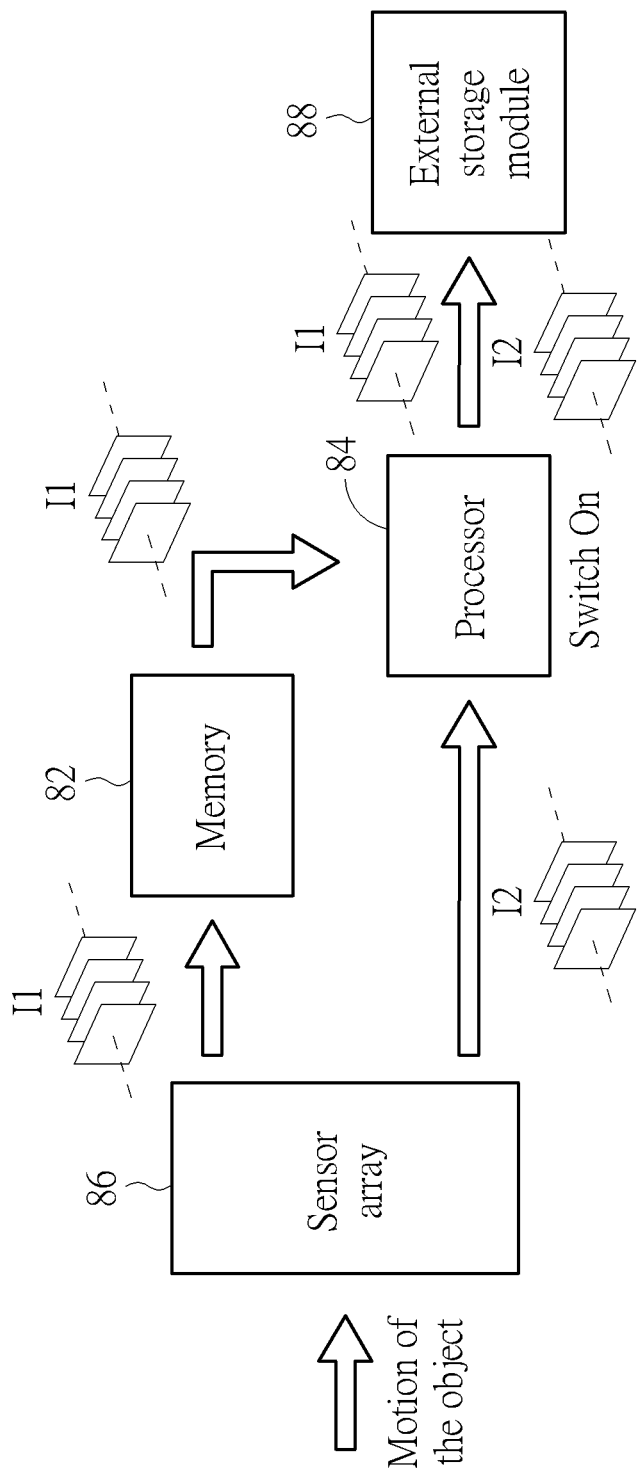
FIG. 7 is a procedural diagram of the smart motion detection device according to the first embodiment of the present invention.

Please refer to FIG. 6 and FIG. 7. FIG. 6 is a functional block diagram of a smart motion detection device 80 according to a first embodiment of the present invention. FIG. 7 is a procedural diagram of the smart motion detection device 80 according to the first embodiment of the present invention. The smart motion detection device 80 can include a memory 82, a processor 84 and a sensor array 86, which are three separate components or combined as one or two integrated components. The sensor array 86 can be directly coupled to the memory 82 and further electrically connected with the processor 84. The sensor array 86 includes a plurality of light detecting pixels arranged in two-dimension manner to capture images. The processor 84 can be switched between a sleep mode and a wakeup mode, and used to process an image captured by the sensor array 86 to identify a particular event in the captured images, such as an unexpected object been captured in the captured images.

The image captured by the sensor array 86 may be pre-stored (i.e., wrote) into the memory 82 or directly transmitted to the processor 84 in accordance with modes of the processor 84 or an alarm signal resulted from motion detection. The memory 82 can have the image capacity of predefined quantity; when the memory 82 is full and a new image is prepared to pre-store, a former image can be removed for storing the new image. The image processed by the processor 84 and the pre-stored image in the memory 82 can be transmitted to an external storage module 88 electrically connected with the smart motion detection device 80.

As the first embodiment shown in FIG. 7, the processor 84 stays in the sleep mode when the smart motion detection device 80 is not activated. The sensor array 86 can include a comparator 90 adapted to generate the alarm signal when monitoring motion of an object. As the processor 84 is operated in the sleep mode, the sensor array 86 continuously or intermittently captures a plurality of images (such as capture five images in every 1 second), and the plurality of images are pre-stored into the memory 82; in the meantime, the comparator 90 reads and compares at least some of the pre-stored images I1 with a reference image. When intensity variation between one of the pre-stored images I1 and the reference image is smaller than a predefined value, the processor 84 keeps in the sleep mode and the comparator 90 reads the next pre-stored image I1 for a comparison with the reference image. When the intensity variation is greater than the predefined value, the comparator 90 can generate the alarm signal utilized to awake the processor 84 and further to pre-store the image captured by the sensor array 86 into the memory 82. That is, the alarm signal is used to switch the processor 84 from the sleep mode to the wakeup mode.

There has variety ways for the comparator 90 to compare the pre-stored images I1 and the reference image, for example the comparator 90 could compare whole image range or only compare partial pixels for the pre-stored images I1 and the reference image. The comparator 90 could compare intensity summation of all pixels or partial pixels, in another way the comparator 90 could compare intensity of each pixel in whole image range or only partial pixels.

When the processor 84 is operated in the wakeup mode, a real-time image 12 captured by the sensor array 86 is directly transmitted to the processor 84 for digital processing and may not be stored into the memory 82. The processor 84 in the wakeup mode may process the real-time image 12 and receive the pre-stored image I1 in the memory 82 by turns, or may receive the pre-stored image I1 after processing of the real-time image 12. A process of the real-time image 12 can precede that of the pre-stored image I1, so the smart motion detection device 80 is able to focus on an instant situation within the monitoring area. The process of the pre-stored image I1 may be executed when the process of the real-time image 12 is completed or paused. If an operating capability of the processor 84 is sufficient for mass data, the real-time image 12 and the pre-stored image I1 can be processed alternately, hence the smart motion detection device 80 can show detection results about the current and previous period at the same time.

In some embodiments, the pre-stored images captured by the sensor array 86 when the processor 84 is operated in the sleep mode can be pre-stored into the memory 82, and the real-time images captured by the sensor array 86 when the processor 84 is operated in the wakeup mode can be transmitted to the processor 84. In other embodiments, the processor 84 and the sensor array 86 can be turned off under a non-working mode; when the smart motion detection device 80 receives a trigger signal, the sensor array 86 can capture and send the images to the memory 82 directly, and then the processor 84 can send a request to the sensor array 86 for receiving the captured images. The trigger signal may be an alarm resulted from an external unit or a built-in unit of the smart motion detection device 80.

In addition, at least one of an image quality and a frame rate of the sensor array 86 may be changed when the processor 84 is operated in the sleep mode or the wakeup mode. For example, as the processor 84 is in the sleep mode, the sensor array 86 can capture the low-quality image or capture the image in the low frame rate for comparing with the reference image. Transmission bandwidth and storage capability are economized accordingly. The alarm signal is generated because the intensity variation between the low-quality image (or the image captured in the low frame rate) and the reference image is greater than the predefined value, so that the sensor array 86 starts to capture the high-quality image or capture the image in the high frame rate for pre-storing into the memory 82, and simultaneously the processor 84 can be switched to the wakeup mode. Then, the pre-stored high-quality image or the pre-stored image captured in the high frame rate in the memory 82 is transmitted to the processor 84 operated in the wakeup mode; therefore the smart motion detection device 80 does not lose image information before the processor 84 is in the wakeup mode.

Figure 8:
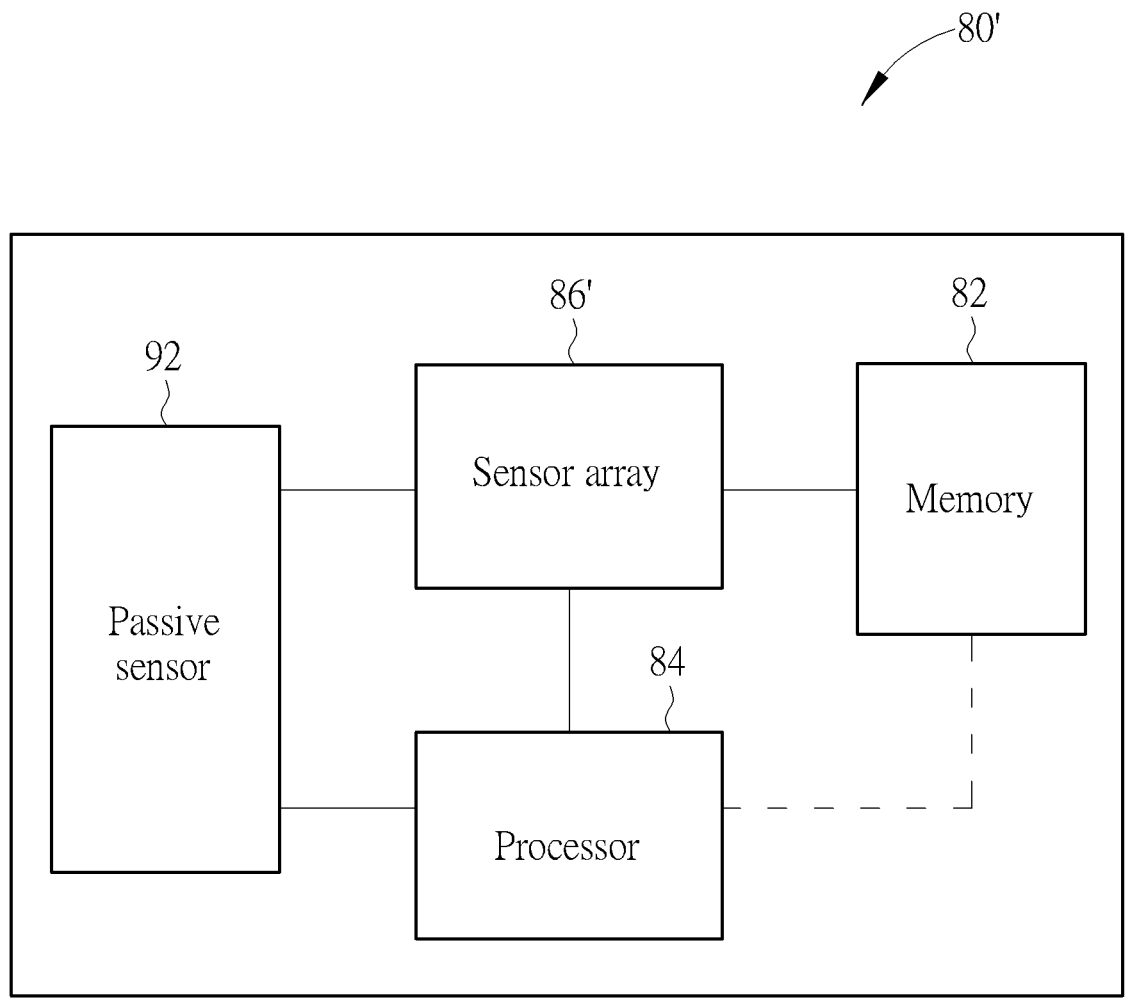
FIG. 8 is a functional diagram of the smart motion detection device according to a second embodiment of the present invention.
Figure 9:
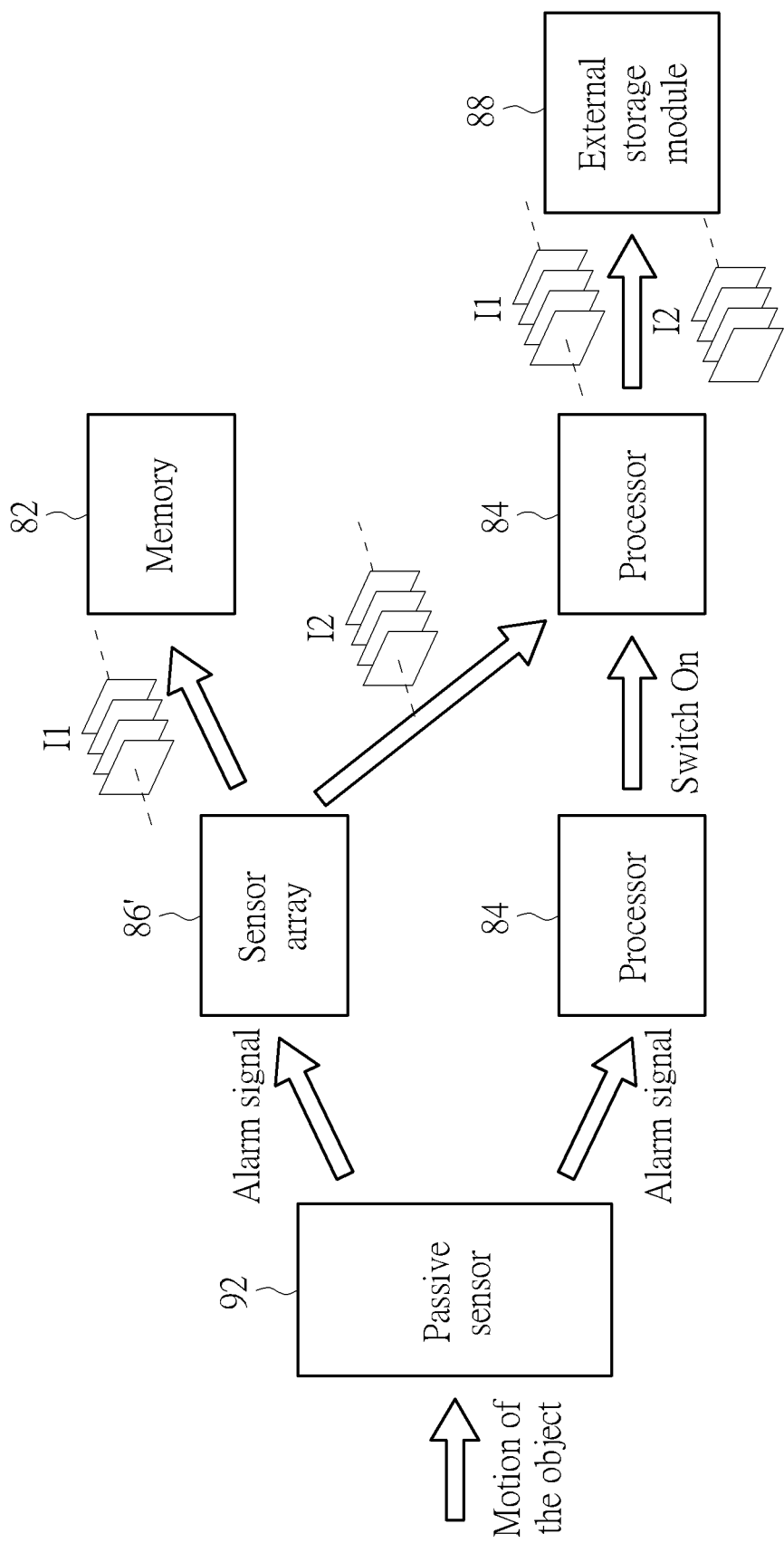
FIG. 9 is a procedural diagram of the smart motion detection device according to the second embodiment of the present invention.
Figure 10:
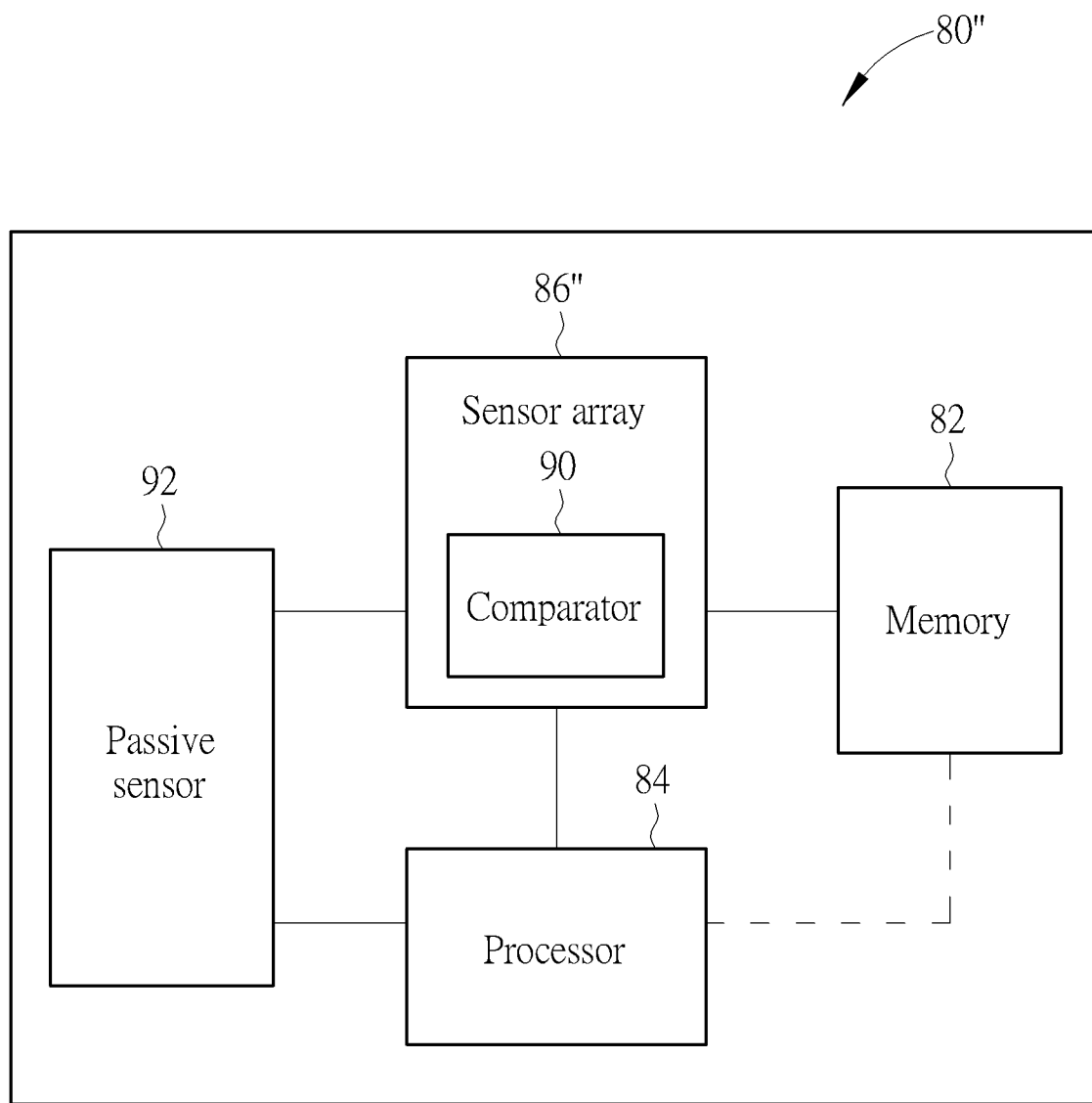
FIG. 10 is a functional diagram of the smart motion detection device according to a third embodiment of the present invention.
Figure 11:
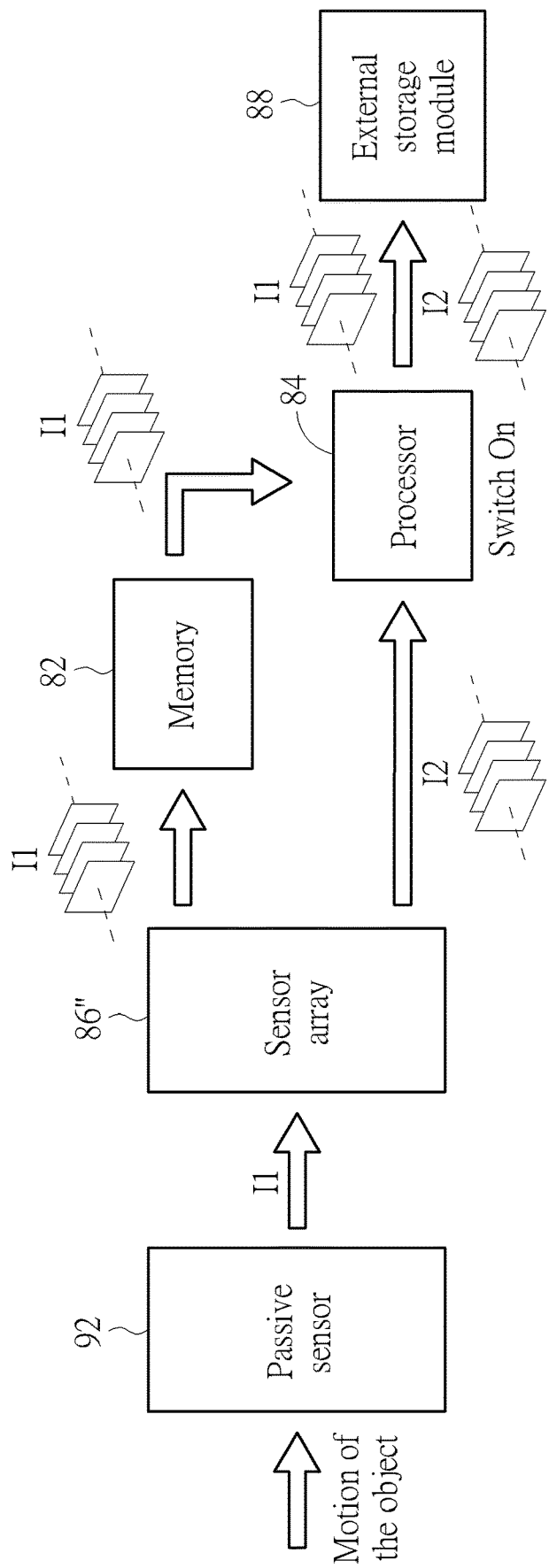
FIG. 11 is a procedural diagram of the smart motion detection device according to the third embodiment of the present invention.

Please refer to FIG. 8 to FIG. 11. FIG. 8 is a functional diagram of the smart motion detection device 80' according to a second embodiment of the present invention. FIG. 9 is a procedural diagram of the smart motion detection device 80' according to the second embodiment of the present invention. FIG. 10 is a functional diagram of the smart motion detection device 80" according to a third embodiment of the present invention. FIG. 11 is a procedural diagram of the smart motion detection device 80" according to the third embodiment of the present invention. In the embodiments, elements having the same numerals as ones of the first embodiment have the same functions, and a detailed description is omitted herein for simplicity.

In a possible embodiment, the smart motion detection device 80' can include the memory 82, the processor 84, the sensor array 86' and a passive sensor 92. The passive sensor 92 is electrically connected with the processor 84 and the sensor array 86'. The processor 84 is kept in the sleep mode and the sensor array 86' is shut down when the passive sensor 92 does not detect any abnormal situation. As the passive sensor 92 detects the motion of the object, the passive sensor 92 can generate the alarm signal, and the alarm signal is used to drive the sensor array 86' and switch the processor 84 from the sleep mode to the wakeup mode. When the processor 84 is still in the sleep mode, the sensor array 86' can capture and transmit the pre-stored image I1 to the memory 82. When the processor 84 is operated in the wakeup mode, the sensor array 86' can capture and transmit the real-time image 12 to the processor 84, and the pre-stored image I1 in the memory 82 can be transmitted to the processor 84 accordingly.

The smart motion detection device 80 may have the non-working mode. The processor 84 and the sensor array 86' can be turned off under the non-working mode. As the passive sensor 92 detects the motion of the object and generates the alarm signal, the sensor array 86' is triggered by the alarm signal and starts to capture and send the pre-stored image into the memory 82. After that, the processor 84 can be switched to the wakeup mode and then sends the request to the sensor array 86' for receiving the pre-stored image.

In another possible embodiment, the smart motion detection device 80" can include the memory 82, the processor 84, the sensor array 86" having the comparator 90, and the passive sensor 92. The passive sensor 92 can activate the sensor array 86" when detecting the abnormal situation. The activated sensor array 86" can capture and transmit the pre-stored image I1 to the memory 82, and the comparator 90 can compare the pre-stored image I1 with the reference image for determining whether to switch on the processor 84. The comparator 90 is utilized to identify the abnormal situation. If the intensity variation between the pre-stored image I1 and the reference image is smaller than the predefined value, the abnormal situation may be resulted from noise and the processor 84 is not switched on. If the intensity variation is greater than the predefined value, the abnormal situation can be defined as someone or something intruding into the monitoring area of the smart motion detection device, so that the processor 84 is switched to the wakeup mode for recording. As the processor 84 is operated in the wakeup mode, the real-time image 12 captured by the sensor array 86" and the pre-stored image I1 in the memory 82 can be transmitted to the processor 84 and then to the external storage module 88 for the digital processing.

Figure 12:
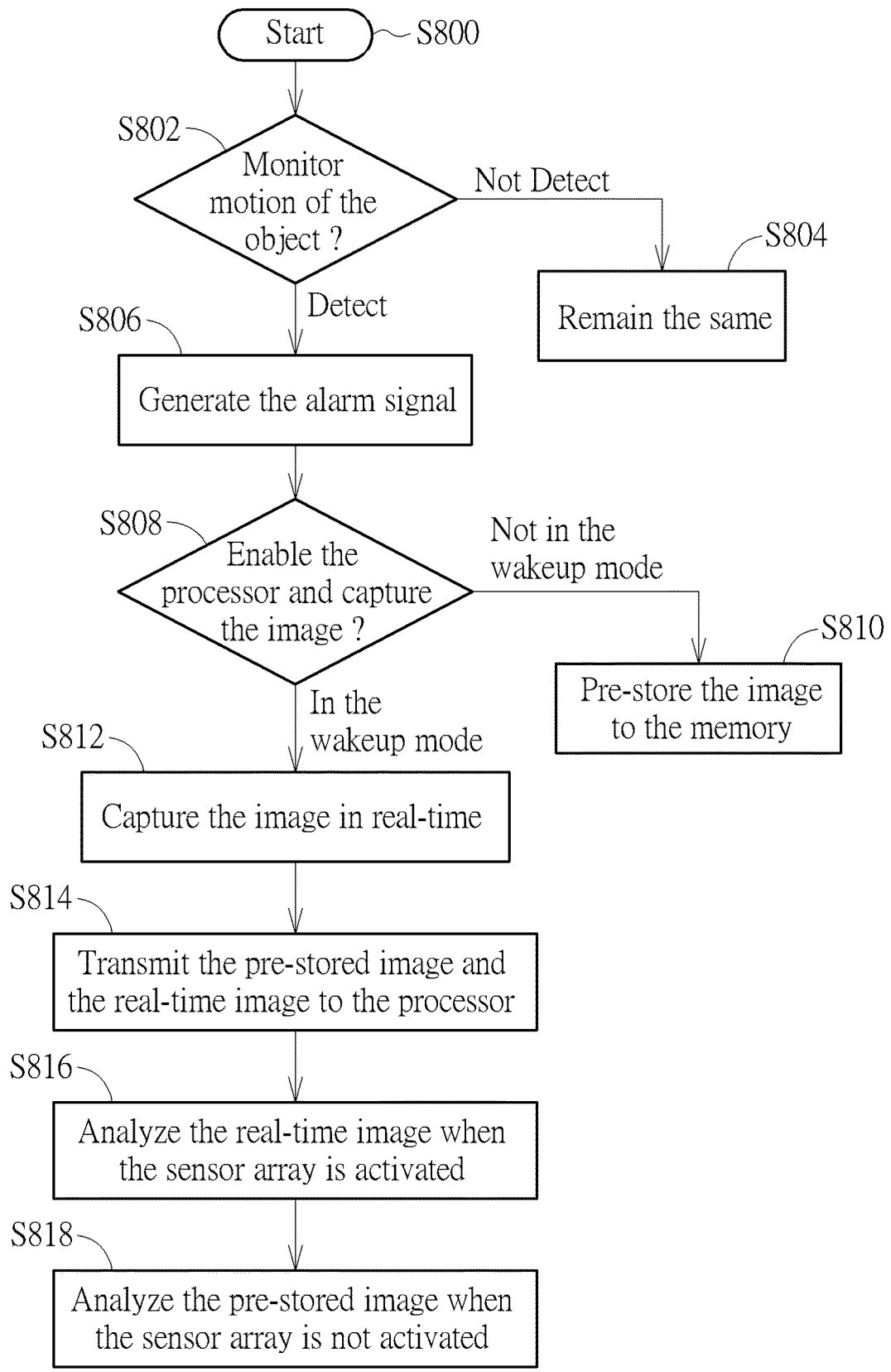
FIG. 12 is a flow chart of a determining method according to the embodiment of the present invention.

Please refer to FIG. 12. FIG. 12 is a flow char of a determining method according to the embodiment of the present invention. The determining method illustrated in FIG. 12 can be suitable for the smart motion detection devices shown in FIG. 6 to FIG. 11. First, steps S800 and S802 are executed to start the determining method and to monitor the motion of the object. The said monitoring function can be applied by the sensor array 86, 86' and 86" or the passive sensor 92. As there is not abnormal situation, step S804 is executed to keep the processor 84 in the sleep mode; as the motion of the object is detected, steps S806 and S808 are executed to generate the alarm signal for enabling the processor 84 and capturing the image via the sensor array 86, 86' and 86". When the processor 84 is not operated in the wakeup mode, step S810 is executed that the sensor array 86, 86' or 86" can produce the pre-stored image I1 in the memory 82. When the processor 84 is operated in the wakeup mode, steps S812 and S814 are executed that the sensor array 86, 86' or 86" can produce the real-time image 12, and both the pre-stored image I1 and the real-time image 12 can be transmitted to the processor 84.

After that, step S816 is executed that the processor 84 can analyze the real-time image 12 captured by the sensor array 86, 86' or 86" when capturing function of the sensor array 86, 86' or 86" is activated. When the sensor array 86, 86' or 86" is not activated, probably owing to the disappeared object or any other situations, step S818 is executed to analyze the pre-stored image I1 inside the memory 82 by the processor 84. It should be mentioned that the processor 84 not only can process the real-time image 12 before the pre-stored image I1, but also alternately process the pre-stored image I1 and real-time image 12 in accordance with the user's actual demand and the sufficient operating capability.

In conclusion, the alarm signal may be generated by the sensor array or the passive sensor (which can be a thermal sensor, an accelerometer or a gyro). The alarm signal is utilized to activate pre-storing operation of the sensor array and mode switching operation of the processor. When the alarm signal is received, the sensor array can be activated to capture the pre-stored image at a first time and the pre-stored image is transmitted to the memory. For waiting a duration of the processor switched from the sleep mode to the wakeup mode, the processor which receives the alarm signal can send a request to the sensor array for the real-time image and the pre-stored image at a second time later than the first time, so that the pre-stored image from the memory are processed later than the first time, and the real-time image is not stored into the memory but directly transmitted to the processor for the digital processing. Comparing to the prior art, the smart motion detection device and the related determining method of the present invention can effectively economize start-up time of the smart motion detection device without waiting for a wakeup period of the processor.

Figure 13:
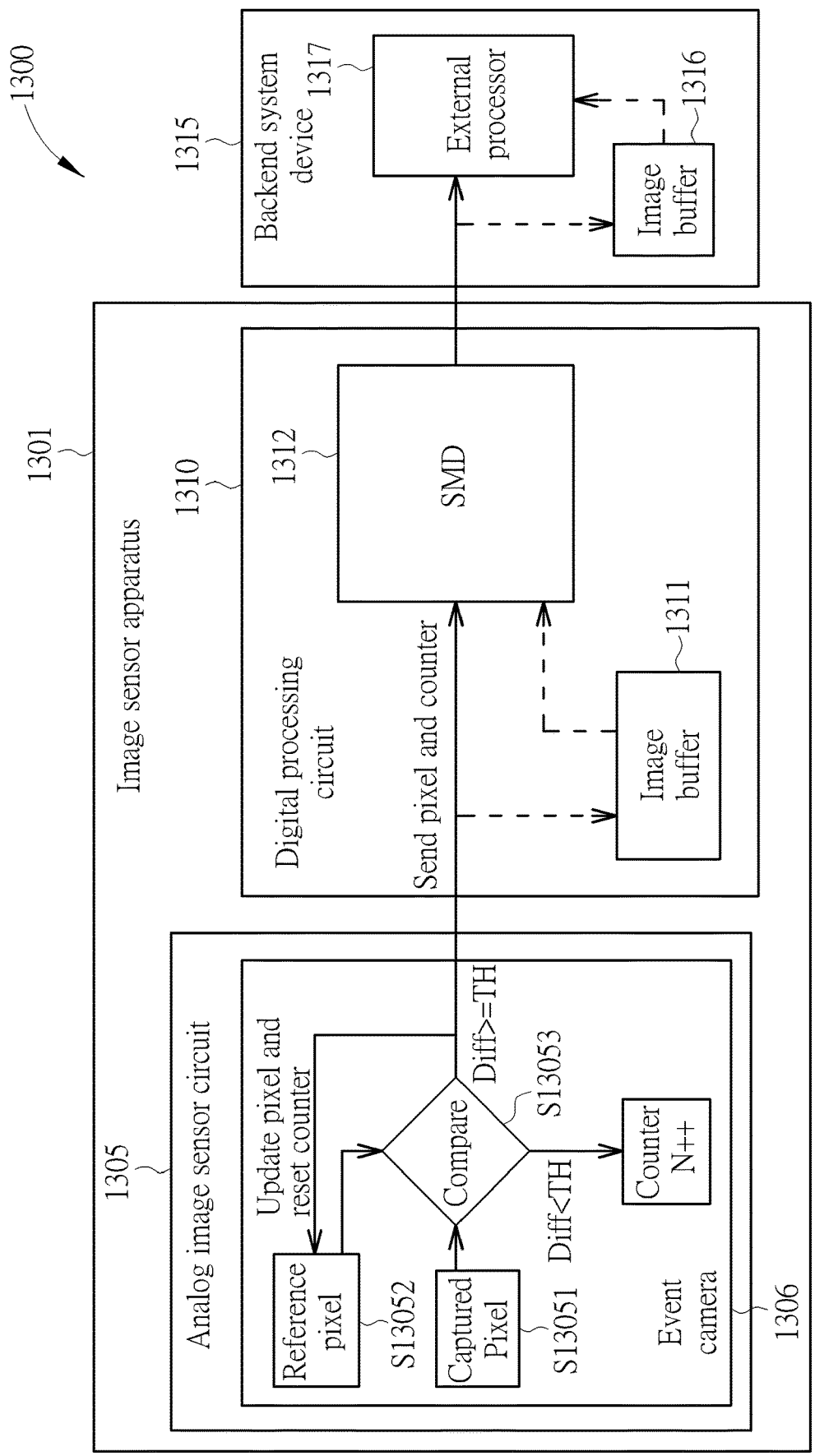
FIG. 13 is a block diagram of a monitoring system according to an embodiment of the invention.
Figure 14:
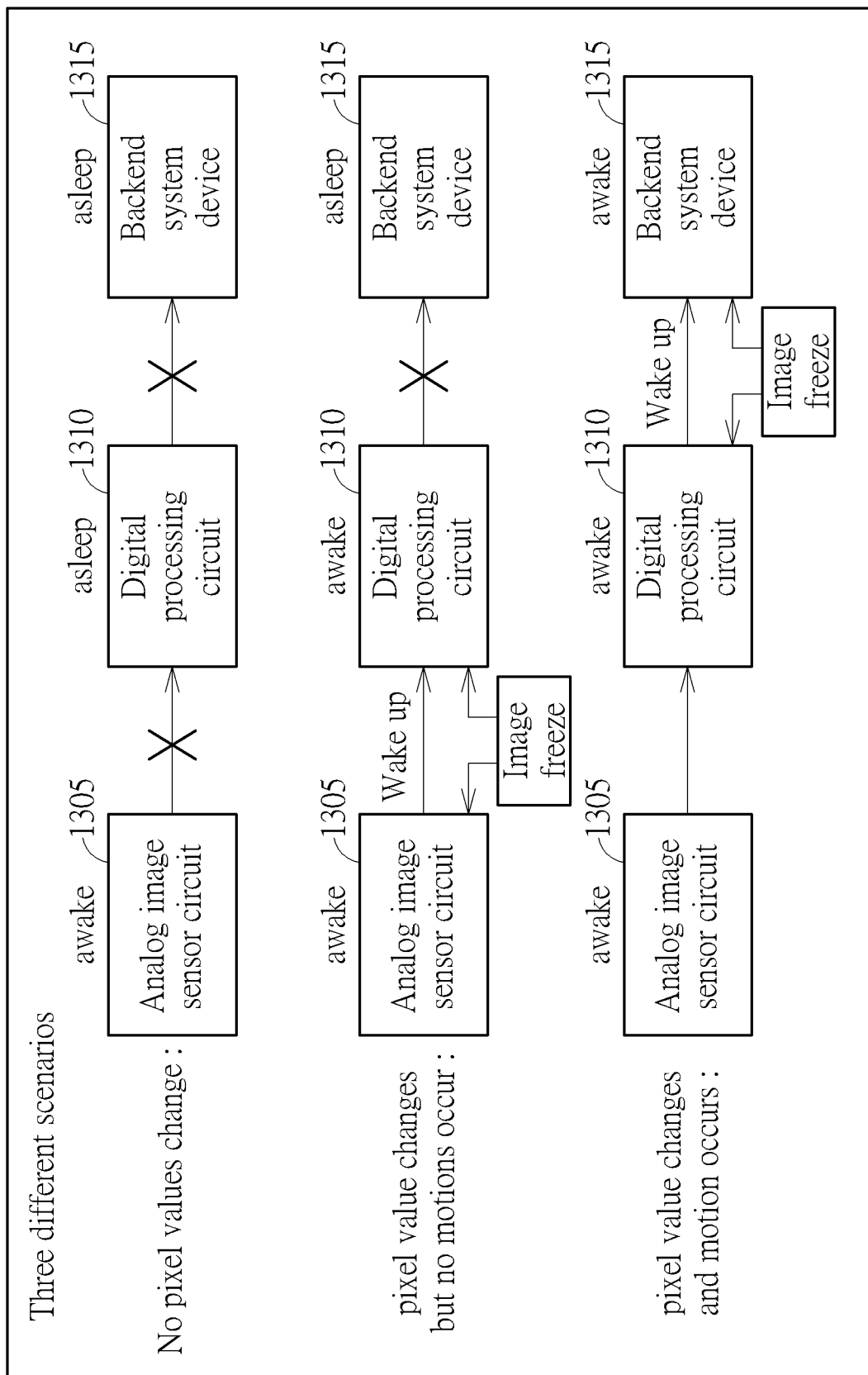
FIG. 14 is a diagram showing three different operation scenarios of the portions/components of monitoring system in FIG. 13.

Please refer to FIG. 13 in conjunction with FIG. 14. FIG. 13 is a block diagram of a monitoring system 1300 according to an embodiment of the invention. FIG. 14 is a diagram showing three different operation scenarios of the portions/components of monitoring system 1300 in FIG. 13. As shown in FIG. 13, the monitoring system 1300 comprises three portions, i.e. an analog integrated circuit (IC) portion/component, a digital IC portion/component, and a backend system device. In other embodiments, the analog IC portion/component and digital IC portion/component may be integrated and implemented as an image sensor apparatus 1301, wherein the image sensor apparatus 1301 could be an integrated circuit (IC). That is, such image sensor apparatus 1301 can be divided into an analog portion (i.e. the analog IC portion/component) and a digital portion (i.e. the digital IC portion/component).

The analog IC portion/component is a collection of analog circuits/components and for example is or comprises an image sensor circuit such as an analog image sensor 1305 which comprises an event camera 1306 (or may be referred to as an event sensor) comprising at least one pixel unit (i.e. one or more pixel units such as pixels or sub-pixels) such as active pixel unit(s). It should be noted that in practice an event camera unit/circuit may comprise a pixel unit and be used to report changes in brightness as they occur and stay silent otherwise. That is, the event camera 1306 is used to detect whether brightness change(s) occur in one or more pixel units.

The digital IC portion/component is a collection of digital circuits/components and is or comprises a digital processing circuit comprising a first image buffer 1311 and a motion detector such as a smart motion detector (SMD) 1312. When the event camera 1306 transmits the information of pixel image/value's change, the SMD 1312 can use such pixel-level information to generate frame data, i.e. a frame-level image, and it can detect whether motion occurs. If it is determined that a motion occurs, then the SMD 1312 can generate an alert signal to the backend system 1315. Instead, if no motions occur, the SMD 1312 does not generate the alert signal. SMD 1312 can accurately detect whether actual motion occurs and filter out some undesired image fluctuations such as motion images of shaking leaves or shaking grasses (not limited).

When receiving an alert signal sent from the digital processing circuit 1310, the backend system 1315 is arranged to receive the image streams (i.e. frames) from the digital processing circuit 1310 and for example to start performing a video recording operation. The backend system 1315 comprises a second image buffer 1316 and an external processor 1317 that is externally coupled to the above-mentioned image sensor apparatus, i.e. the analog IC portion/component and digital IC portion/component.

The startup speed/time of the event camera 1306 (or the analog image sensor circuit 1305) is much faster than that of the SMD 1312 (or digital processing circuit 1310) and also much faster than that of the external processor 1317 (or the backend system device 1315). In one embodiment, if no pixel values change, only the event camera 1306 (or only the analog image sensor circuit 1305) is powered on and the other circuits (i.e. the digital processing circuit 1310 and the backend system device 1315) are powered off or left in a power saving mode (such as working under a low operating frequency), to save more power. Once the event camera 1306 (or the analog image sensor circuit 1305) detects that a pixel value changes, the SMD 1312 is awakened by a trigger signal, sent from the analog image sensor circuit 1305, to perform the above-mentioned motion detection. Only when the motion detection indicates that an actual motion occurs, the external processor 1317 in the backend system device 1315 is awakened by a trigger signal, sent from the digital processing circuit 1310, to perform further image processing and/or the video recording operation. If the event camera 1306 includes a plurality of pixels, then the "no pixel values change" may refer to "the number of pixels that has pixel values change less than a first specific threshold," and the "a pixel value changes" may refer to "a number of pixels that has a pixel value change exceed than a second specific threshold".

If the pixel value changes before the SMD 1312 is completely wakened, the pixel value(s) sensed by the image sensor circuit 1305 is/are stored into the first image buffer 1311, and then will be transmitted/transferred to the SMD 1312 once the SMD 1312 is completely awakened and able to receive the sensed pixel value(s). That is, when the event camera 1306 is going to send pixel value(s) to the digital processing circuit 1310, the pixel value(s) will be stored into the first image buffer 1311 before the SMD 1312 is wakened and the first image buffer 1311 may store a plurality of pixel values from the event camera 1306 before the SMD 1312 is wakened. Then, similarly, when it is determined that the frame data formed by the sensed pixel value(s) is associated with an actual motion event before the external processor 1317 is completely wakened, the frame(s) or image stream(s) processed by the digital processing circuit 1310 is/are stored into the second image buffer 1316, and then will be transmitted/transferred to the external processor 1317 once the external processor 1317 is completely wakened and able to receive the sensed frame(s) or image stream(s). Also, when the digital processing circuit 1310 is going to send frame(s) to the backend system device 1315, the frame(s) will be stored into the second image buffer 1316 before the external processor 1317 is wakened and the second image buffer 1316 may store a plurality of frames from the digital processing circuit 1310 before the external processor 1317 is wakened. By using the above-mentioned mechanisms and first/second image buffer(s), more power can be saved as well as image lost can be avoided.

As shown in FIG. 14, for example, the analog image sensor circuit 1305 is always awake (i.e. at an awake state or in a normal mode different from a power saving mode) when it is supplied with power, to continuously or periodically detect whether the pixel value(s) of one or more pixel units change. In a first operation scenario (but not limited), if it is determined that no pixel values change, the analog image sensor circuit 1305 does not send a trigger signal to wake up the digital processing circuit 1310 and the backend system device 1315. Thus, the digital processing circuit 1310 and the backend system device 1315 are kept asleep (i.e. at an asleep state or in the power saving mode). In this situation, the analog image sensor circuit 1305 does not transmit pixel data to the digital processing circuit 1310 and backend system device 1315.

In a second operation scenario (but not limited), if it is determined that at least one pixel value changed, then the analog image sensor circuit 1305 is arranged to send a trigger signal to wake up the digital processing circuit 1310 and also send the sensed pixel data to the digital processing circuit 1310. In the situation that the startup speed/time of the first image buffer 1311 is much faster than that of SMD 1312, the sensed pixel data can be temporarily stored in the first image buffer 1311 by using an image freeze operation before the SMD 1312 is completely awakened. After the digital processing circuit 1310 completely exits the power saving mode and enters the normal mode, the pixel data sensed by the analog image sensor circuit 1305 can be directly transmitted to the SMD 1312 without using the first image buffer 1311. In this situation, if it is determined that no actual motions occur, then the digital processing circuit 1310 does not send an alert signal to wake up the backend system device 1315 and also does not transmit the generated frames or image streams to the backend system device 1315.

It should be noted that the SMD 1312 can simultaneously receive and process both the stored pixel data of the first image buffer 1311 and the incoming pixel data once the SMD 1312 completely enters the normal mode. For example (not limited), the SMD 1312 can employ a super high frame per second (HFPS) image processing frequency/rate to rapidly process the accumulated pixel values stored in the first image buffer 1311 and then synchronize the processed pixel values with the analog values of incoming pixel data. For instance, each time when the analog image sensor circuit 1305 is called to sense pixel units, the SMD 1312 is arranged to process the accumulated pixel values stored in the first image buffer 1311 and process the analog values of incoming pixel data in parallel until the first image buffer 1311 is empty.

In a third operation scenario (but not limited), the first image buffer 1311 can be used to collect and store the pixel information (values or differences) of pixel units, which are transmitted from the analog image sensor circuit 1305, to form and generate data of one or more complete frames. The SMD 1312 can determine whether an actual motion occurs based on the generated frame data. If it is determined that an actual motion occurs, the digital processing circuit 1310 is arranged to send an alert signal to wake up the backend system device 1315 and also transmit the sensed frames or image streams to the backend system device 1315. In this situation, the sensed frames or image streams may be temporarily stored in the second image buffer 1316 by using the image freeze operation before the backend system device 1315 is completely awakened. When the backend system device 1315 completely exits the power saving mode and enters the normal mode, sensed frames or image streams can be directly transmitted to the external processor 1317 without being buffered in the second image buffer 1316.

Refer back to FIG. 13 again. Specifically, to determine whether a pixel value (one or each pixel value) changes, the event camera 1306 is arranged for sensing/capturing the current pixel value of a corresponding pixel unit to detect whether the pixel value changes. The event camera 1306 for example senses or captures the current pixel value of the pixel unit (as shown by S13051), and then it calculates a pixel difference Diff between the sensed current pixel value and a reference pixel value of the pixel unit wherein the reference pixel value of such pixel unit (as shown by S13052) can be a previous pixel value of the pixel unit sensed by the event camera at an earlier timing or an average of a plurality of pixel values of the pixel unit sensed by the event camera at an earlier timing. Accordingly, for more or all pixel units, the event camera 1306 can capture a plurality of current pixel values and then calculate or generate a plurality of pixel differences respectively corresponding to a plurality of pixel units.

Then, the event camera 1306 determines whether the pixel value changed by comparing the pixel difference Diff with a pixel threshold TH (as shown by S13053). If the pixel difference Diff becomes higher than the pixel threshold TH, the event camera 1306 can determine that the pixel value changes. Instead, if the pixel difference Diff is not higher than the pixel threshold TH, the event camera 1306 determines that the pixel value does not change. It should be noted that in this embodiment the pixel value changing means that the pixel value varies significantly while the pixel value not changing means that the pixel value is not varied or varies insignificantly.

When the pixel difference Diff becomes equal to or higher than the pixel threshold TH, the event camera 1306 is arranged to generate and send a trigger signal to wake up the digital processing circuit 1310, send the currently counted value of a counter value N and the information/data associated with the currently captured pixel value to the digital processing circuit 1310, update the reference pixel value by using the currently captured pixel value, and reset the counter value N as zero. The counter value N is configured as zero initially. If the SMD 1312 is not in the normal mode, the currently counted value of the counter value N and the information/data associated with the currently captured pixel value can be temporarily stored in the first image buffer 1311. It should be noted that the pixel difference Diff of the pixel unit is calculated and updated each time after an exposure operation, performed upon the pixel unit, is finished to obtain its currently sensed pixel value. When the pixel difference Diff is not higher than the pixel threshold TH, the event camera 1306 is arranged to increment or accumulate the counter value N by one. In this situation, the event camera 1306 does not send the trigger signal, the currently counted value of the counter value N and, the information/data associated with the currently captured pixel value.

The value of such counter value N is used to indicate the number of timings of consecutive frames during which the pixel value of a pixel unit does not change. Equivalently, the counter value N, employed by the event camera 1306, is arranged to determine a time interval between the pixel value of such pixel unit changing twice. It should be noted that the values of counter values N corresponding to different pixel units may be identical, different, or may be partially different. In one embodiment, a resultant counter value can be selected from the values of counter values N corresponding to different pixel units, and such resultant counter value for example may be a smallest one in all the counter values N corresponding to different pixel units. The selected resultant counter value can be used to indicate a number of timings of consecutive frames during which the pixel values of all the pixel units do not change.

Further, for example (but not limited), the frame rate may be equal to 30 Hz, i.e. 30 frames in one second, and the counter value N may be sequentially accumulated from zero to 30 during one second if it is determined that the pixel value of the pixel unit does not change during such one second. In this situation, if it is then determined that the pixel value changes at a next frame timing, then the counter value N will not be counted to for example 31, and the event camera 1306 is arranged to generate a trigger signal to wake up the digital processing circuit 1310 and to transmit the currently counted counter value (i.e. 30) to the digital processing circuit 1310 before the counter value N is reset as zero. Also, at the same time, the event camera 1306 is arranged to output information/data of the sensed/captured pixel value to the digital processing circuit 1310.

The information/data of the sensed/captured pixel value which changes may be transmitted from the analog image sensor circuit 1305 to the digital processing circuit 1310 by using at least two different ways. In one embodiment, the event camera 1306 may send an actual value of the currently captured pixel value to the digital processing circuit 1310, and the digital processing circuit 1310 can directly use the actual value to replace a corresponding value of a pixel unit in a previous frame to generate a current frame. Further, in other embodiments, the event camera 1306 may send a difference value between the actual value of the actually captured pixel value and the actual value of a previously captured pixel value to the digital processing circuit 1310, and the digital processing circuit 1310 can add such difference value into a corresponding value of a pixel unit in a previous frame to generate a current frame.

Figure 15:
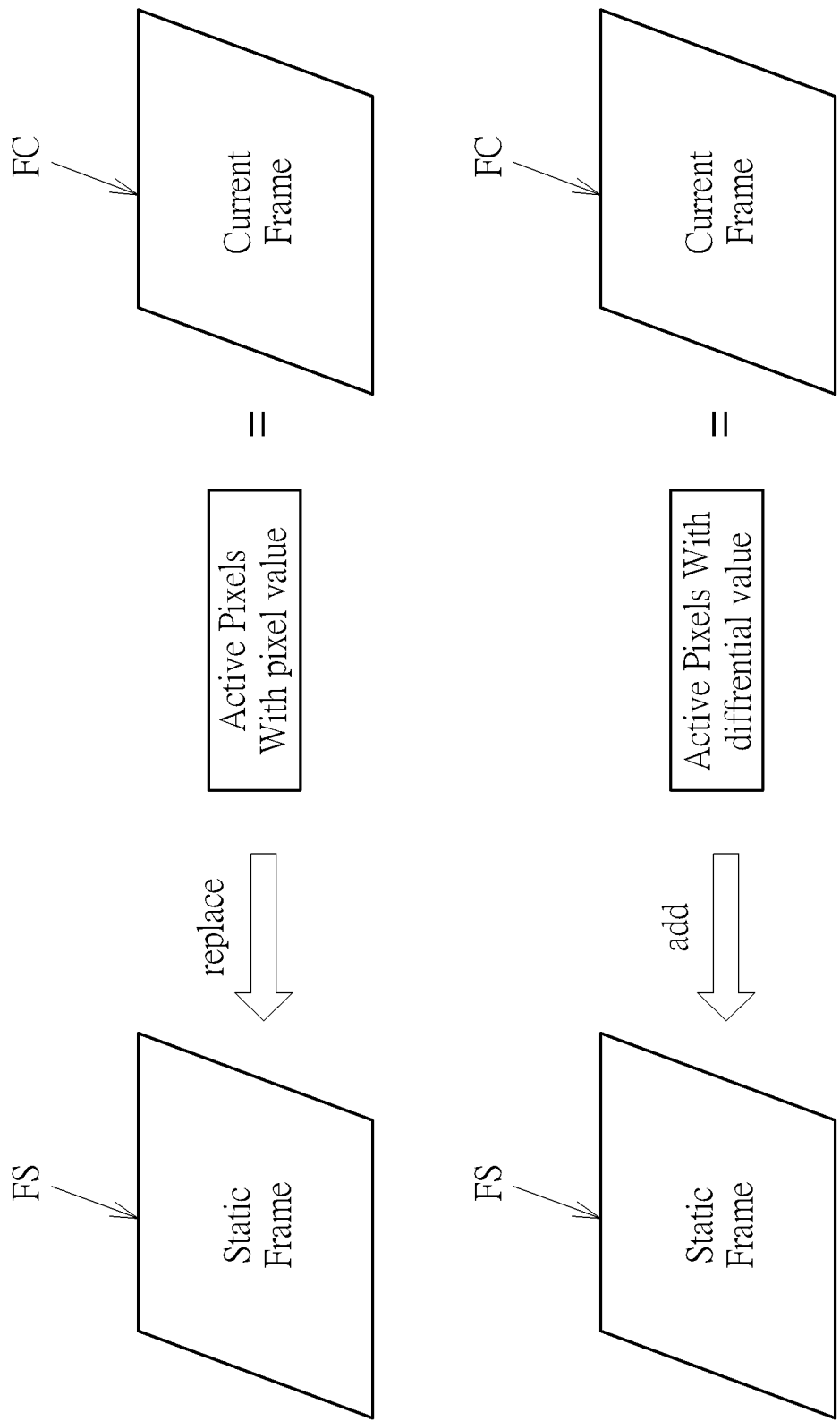
FIG. 15 is a diagram showing two different operations for updating and generating data of a current frame for the digital processing circuit as shown in FIG. 13.

Refer to FIG. 15. FIG. 15 is a diagram showing two different operations for updating and generating data of a current frame for the digital processing circuit 1310 (or SMD 1312). For a pixel unit such as an active pixel unit, data of a last previous frame can be stored in the SMD 1312 as a static frame FS even though some partial circuits within SMD 1312 is powered off. Such static frame FS is generated by the digital processing circuit 1310 at an earlier timing when the event camera 1306 detects the pixel value(s) change(s); that is, the static frame FS is associated with the previous pixel value (s). As shown in a first scenario of FIG. 15, When it is determined that the pixel value of the active pixel unit changes at a current frame timing, the event camera 1306 in the first scenario transmits the actual pixel value of such active pixel unit to the image buffer 1311 of digital processing circuit 1310 so that the image data associated with the change of pixel value can be stored in the image buffer 1311. Then, after SMD 1312 completely enters the normal mode, the SMD 1312 can generate the current frame FC based on the data of the static frame FS and the actual value of the pixel value. In practice, the SMD 1312 is arranged to use the actual value to replace the previous value of such active pixel unit in the static frame FS to generate the current frame FC.

Further, as shown in a second scenario of FIG. 15, for the active pixel unit, when it is determined that the pixel value of the active pixel unit changes at the current frame timing, the event camera 1306 in the second scenario transmits the difference value of previously captured and currently captured pixels corresponding to such active pixel unit to the image buffer 1311 of digital processing circuit 1310. Then, after SMD 1312 completely enters the normal mode, the SMD 1312 can generate the current frame FC based on the data of the static frame FS and the difference value. In practice, the SMD 1312 adds the difference value into the previous pixel value of the same active pixel unit in the static frame FS to generate the current frame FC.

In one embodiment, when the current frame FC is generated, the SMD 1312 (or digital processing circuit 1310) is arranged to determine whether a motion occurs by generating one or more background frames based on the generated current frame FC and the counter value N and then comparing the current frame FS with the background frames. In practice, information/data of a previous background frame can be stored in a memory circuit of the SMD 1312, and the information stored in the memory circuit does not vanish even though the SMD 1312 is powered off. If the SMD 1312 has been kept in the normal mode, then the SMD 1312 may perform a recursive moving average operation based on a previous background frame and the current frame FC to generate a current background frame. For example (not limited), the current background frame can be determined by the following equation:

$$FB_i = \frac{FB_{i-1} + FC}{2}$$

wherein $FB_i$ indicates data of the generated current background frame at a current frame timing i, $FB_{i-1}$ indicates data of a previous background frame at a previous frame timing i−1 and FC indicates the current frame (or called as a current data frame). Similarly, the next background frame based on the recursive moving average operation can be determined by the following equation:

$$FB_{i+1} = \frac{FB_i + FC'}{2}$$

wherein FC' is a next data frame. Usually, in a monitoring system, the curve corresponding to the background frames at the different frame timings will be convergenced into a stable background frame after a specific training time period.

However, if the SMD 1312 just exited the power saving mode and no data of the previous background frame can be used to generate the current background frame $FB_i$, then the SMD 1312 does not execute the recursive moving average operation. in this situation, the SMD 1312 is arranged to employ the counter value N to generate a weighting value and then use the weighting value, current data frame FC, and a last background frame $FB_{i-N}$ stored in the memory circuit of SMD 1312 when the SMD 1312 becomes powered off. In this situation, the current background frame $FB_i$ can be determined by the following equation:

$$FB_i = \alpha \times FB_{i-N} + (1-\alpha) \times FC$$

wherein $\alpha$ is the weighting value generated based on the counter value N. in a simplified example (not limited), the weighting value $\alpha$ may be equal to $$\frac{N-1}{N} \text{ or } \frac{N}{N+1}.$$

For instance, if the value N is equal to 30, then $\alpha$ is equal to 29/30, and the current background frame $FB_i$ can be determined by the following equation:

$$FB_i = \frac{29}{30} \times FB_{i-k} + \frac{1}{30} \times FC;$$

and alternatively, the current background frame $FB_i$ may be determined by the following equation:

$$FB_i = \frac{30}{31} \times FB_{i-k} + \frac{1}{31} \times FC.$$

However, this is not meant to be a limitation of the invention. In other words, the weighting value $\alpha$ can be dynamically determined based on the number of how many consecutive frames which a pixel unit's image/value does not change. The calculation of using the counter value N to directly generate the current background frame $FB_i$ without executing the recursive moving average operation becomes more simplified since in this situation executing the recursive moving average operation needs recursively calculating data of background frames $FB_{i-}, \ldots, FB_{i-(N-1)}$.

To determine whether a motion occurs in the current frame FC, the SMD 1312 is arranged to calculate a frame difference between the current background frame $FB_i$ and the current data frame FC, and then it compares the frame difference with a motion threshold THM to determine whether the motion occurs. When the frame difference becomes higher than the motion threshold THM, the SMD 1312 can determine that the motion occurs and then generate an alarm signal to the backend system device 1315.

The motion threshold THM for example may be a fixed threshold value or can be dynamically adjusted. In one embodiment, the SMD 1312 can use a curve fitting operation to dynamically adjust the motion threshold THM according to a previous value of the motion threshold THM, the current background frame $FB_i$, the current data frame FC, and the counter value N.

Then, for generating a next background frame $FB_{i+1}$, the SMD 1312 for example can execute the recursive moving average operation based on the generated current background frame $FB_i$ and a next data frame FC' when the next data frame FC' is generated by using the information/data of pixel value sent from the event camera 1306.

Figure 16:
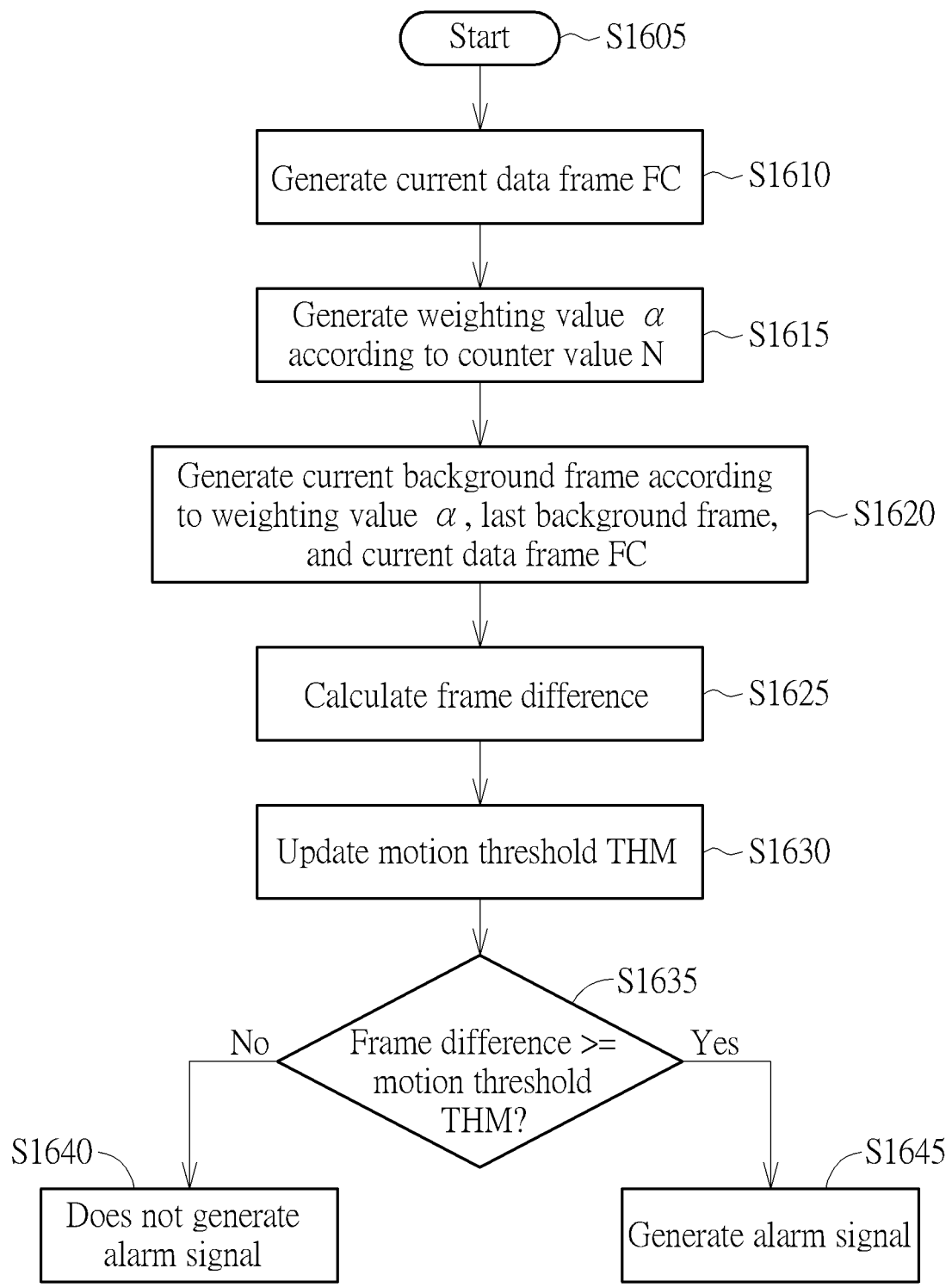
FIG. 16 is a flowchart diagram of the operations of SMD that just entered the normal mode according to an embodiment of the invention.

To make readers more clearly understand the operations mentioned above, FIG. 16 is provided. FIG. 16 is a flowchart diagram of the operations of SMD 1312 that just entered the normal mode according to an embodiment of the invention. The steps are described in the following:

Step 1605: Start;

Step 1610: Generate current data frame FC according to the previous data/static current FS and information/data of the pixel image/value changing (e.g. the actual pixel value or pixel difference value);

Step 1615: Generate a weighting value $\alpha$ according to the counter value N which is received from the event camera 1306 and buffered in the first image buffer 1311;

Step 1620: Generate a current background frame according to the weighting value $\alpha$, the last background frame stored by the SMD 1312, and the current data frame FC;

Step 1625: calculate a frame difference between the current data frame FC and the current background frame;

Step 1630: Dynamically update the motion threshold THM according to the previous/original value of motion threshold THM, the last background frame, and the current data frame FC;

Step 1635: Determine whether the frame difference is equal to or higher than the motion threshold THM; if it is equal to or higher than the motion threshold THM, the flow proceeds to Step 1645; otherwise, the flow proceeds to Step 1640;

Step 1640: Does not generate the alarm signal; and

Step 1645: Generate the alarm signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An analog image sensor circuit coupled to a digital processing circuit that is arranged for performing a motion detection, comprising:
   an event camera comprising:
      at least one pixel unit;
   wherein the event camera is arranged for sensing at least one current pixel value of the at least one pixel unit to detect whether at least one pixel value changes; when the at least one pixel value changes, the event camera triggers the digital processing circuit and transmits information of the at least one pixel value to the digital processing circuit when the at least one pixel value changes, the event camera further transmits a counter value to the digital processing circuit the counter value corresponds to a time interval between an event of the digital processing circuit entering the power saving mode and an event of the at least one pixel value changing; and, the counter value is incremented by one and is not transmitted at a frame timing when the at least one pixel value does not change.

2. The image sensor circuit of claim 1, wherein the information of the at least one pixel value and the counter value is stored into a first image buffer of the digital processing circuit before the digital processing circuit completely exits the power saving mode and enters a normal mode, to make the digital processing circuit after completely entering the normal mode perform the motion detection according to the counter value and the information of the at least one pixel value which are stored in the first image buffer.

3. The image sensor circuit of claim 1, wherein the event camera is arranged for:
   determining that the at least one pixel value changes when at least one pixel difference between at least one reference pixel value of the at least one pixel unit and the at least one current pixel value of the at least one pixel unit is higher than a pixel threshold;
   generating the information of the at least one pixel value;
   outputting the counter value and the information of the at least one pixel value to the digital processing circuit;
   updating the at least one reference pixel value as the at least one current pixel value; and
   resetting the counter value as zero.

4. The image sensor circuit of claim 1, wherein the event camera is arranged for:
   determining that the at least one pixel value does not change when the at least one pixel difference is lower than the pixel threshold;
   not outputting the counter value and the information of the at least one pixel value to the digital processing circuit; and
   accumulating the counter value by one.

5. The image sensor circuit of claim 1, wherein when the event camera determines that the at least one pixel value changes, the event camera transmits a trigger signal to wake up the digital processing circuit which is in the power saving mode.

6. The image sensor circuit of claim 1, wherein the information of the at least one pixel value is at least one actually captured value of the at least one pixel value.

7. The image sensor circuit of claim 1, wherein the information of the at least one pixel value is at least one difference value between at least one current pixel value and at least one previous pixel value of the at least one pixel unit.

8. An image sensor apparatus, comprising:
   an image sensor circuit, comprising:
      an event camera, comprising:
         at least one pixel unit and
   a digital processing circuit, externally coupled to the image sensor circuit, arranged for perform a motion detection;
   wherein the event camera is arranged for sensing at least one current pixel value of the at least one pixel unit to detect whether at least one pixel value changes; when the at least one pixel value changes, the event camera triggers the digital processing circuit and transmits information of the at least one pixel value to the digital processing circuit the digital processing circuit uses of the at least one current pixel value and a last data frame stored in the digital processing circuit to generate a current data frame; the digital processing circuit generates a current background frame according to a counter value, the current data frame, and a last background frame stored by the digital processing circuit, without performing a recursive calculation; the counter value corresponds to a time interval between an event of the digital processing circuit entering a power saving mode and an event of the at least one pixel value changing.

9. The image sensor apparatus of claim 8, wherein the digital processing circuit uses the counter value to generate a weighting value, and then uses the weighting value, the current data frame, and the last background frame to directly calculate the current background frame.

10. The image sensor apparatus of claim 9, wherein the digital processing circuit is arranged for:
   calculating a frame difference between the current data frame and the current background frame;
   comparing the frame difference with a motion threshold to determine whether a motion occurs in the current data frame; and
   generating and outputting an alarm signal to a backend monitoring system externally coupled to the image sensor apparatus when the motion occurs.

11. A method of an image sensor apparatus, comprising:
   providing a digital processing circuit, externally coupled to an image sensor circuit, arranged for perform a motion detection, and the image sensor circuit comprising an event camera which comprises at least one pixel unit, wherein the event camera is arranged for sensing at least one current pixel value of the at least one pixel unit to detect whether at least one pixel value changes, and when the at least one pixel value changes, the event camera triggers the digital processing circuit and transmits information of the at least one pixel value to the digital processing circuit; and
   using the at least one current pixel value and a last data frame stored in the digital processing circuit to generate a current data frame;
   generating a current background frame according to the counter value, the current data frame, and a last background frame stored by the digital processing circuit, without performing a recursive calculation;
   wherein the counter value corresponds to a time interval between an event of the digital processing circuit entering a power saving mode and an event of the at least one pixel value changing.

12. The method of claim 11, further comprising:
using the counter value to generate a weighting value; and
using the weighting value, the current data frame, and the last background frame to directly calculate the current background frame.

13. The method of claim 12, further comprising:
calculating a frame difference between the current data frame and the current background frame;
comparing the frame difference with a motion threshold to determine whether a motion occurs in the current data frame; and
generating and outputting an alarm signal to a backend monitoring system externally coupled to the image sensor apparatus when the motion occurs.

14. A method of an image sensor circuit to be externally coupled to a digital processing circuit that is arranged for performing a motion detection, comprising:
providing an event camera comprising at least one pixel unit;
using the event camera to sense at least one current pixel value of the at least one pixel unit to detect whether at least one pixel value changes;
when the at least one pixel value changes, using the event camera to trigger the digital processing circuit when the digital processing circuit is in a power saving mode and transmit information of the at least one pixel value to the digital processing circuit;
using the event camera to transmit a counter value to the digital processing circuit when the at least one pixel value changes;
incrementing the counter value by one at a frame timing when the at least one pixel value does not change and not transmitting the counter value; and
wherein the counter value corresponds to a time interval between an event of the digital processing circuit entering the power saving mode and an event of the at least one pixel value changing.

15. The method of claim 7, wherein the information of the at least one pixel value and the counter value is stored into a first image buffer of the digital processing circuit before the digital processing circuit completely exits the power saving mode and enters a normal mode, to make the digital processing circuit after completely entering the normal mode perform the motion detection according to the counter value and the information of the at least one pixel value which are stored in the first image buffer.

16. The method of claim 7, further comprising:
determining that the at least one pixel value changes when at least one pixel difference between at least one reference pixel value of the at least one pixel unit and the at least one current pixel value of the at least one pixel unit is higher than a pixel threshold;
generating the information of the at least one pixel value;
outputting the counter value and the information of the at least one pixel value to the digital processing circuit;
updating the at least one reference pixel value as the at least one current pixel value; and
resetting the counter value as zero.

17. The method of claim 7, further comprising:
determining that the at least one pixel value does not change when the at least one pixel difference is lower than the pixel threshold;
not outputting the counter value and the information of the at least one pixel value to the digital processing circuit; and
accumulating the counter value by one.

18. The method of claim 14, further comprising:
when the at least one pixel value changes, transmitting a trigger signal from the event camera to wake up the digital processing circuit which is in the power saving mode.

19. The method of claim 14, wherein the information of the at least one pixel value is at least one actually captured value of the at least one pixel value.

20. The method of claim 14, wherein the information of the at least one pixel value is at least one difference value between the at least one current pixel value and at least one previous pixel value of the at least one pixel unit.

* * * * *